(12) United States Patent
Couture et al.

(10) Patent No.: US 11,340,361 B1
(45) Date of Patent: May 24, 2022

(54) WIRELESS TRANSMISSION DETECTOR PANEL FOR AN X-RAY SCANNER

(71) Applicant: American Science and Engineering, Inc., Billerica, MA (US)

(72) Inventors: Aaron Judy Couture, Reading, MA (US); Riley Phelps, Lowell, MA (US); Jeffrey M. Denker, Woburn, MA (US)

(73) Assignee: American Science and Engineering, Inc., Billerica, MA (US)

( * ) Notice: Subject to any disclaimer, the term of this patent is extended or adjusted under 35 U.S.C. 154(b) by 0 days.

(21) Appl. No.: 17/102,299

(22) Filed: Nov. 23, 2020

(51) Int. Cl.
*G01T 1/208* (2006.01)
*G01T 1/16* (2006.01)

(52) U.S. Cl.
CPC ............ *G01T 1/208* (2013.01); *G01T 1/1606* (2013.01)

(58) Field of Classification Search
CPC ......... G01T 1/208; G01T 1/1606; G01T 1/36; G01T 1/362; G01T 1/368; G01T 7/00; A61B 6/00; A61B 6/02
See application file for complete search history.

(56) References Cited

U.S. PATENT DOCUMENTS

| | | |
|---|---|---|
| 2,831,123 A | 4/1958 | Daly |
| 2,972,430 A | 2/1961 | Johnson |
| 3,766,387 A | 10/1973 | Heffan |
| 3,780,291 A | 12/1973 | Stein |
| 3,784,837 A | 1/1974 | Holmstrom |
| 3,961,186 A | 6/1976 | Leunbach |
| 3,971,948 A | 7/1976 | Pfeiler |
| 4,031,401 A | 6/1977 | Jacob |
| 4,045,672 A | 8/1977 | Watanabe |
| 4,047,035 A | 9/1977 | Dennhoven |
| 4,064,440 A | 12/1977 | Roder |
| 4,139,771 A | 2/1979 | Dennhoven |
| 4,180,737 A | 12/1979 | Kingsley |
| 4,210,811 A | 7/1980 | Dennhoven |
| 4,216,499 A | 8/1980 | Dennhoven |
| 4,242,583 A | 12/1980 | Annis |
| 4,259,582 A | 3/1981 | Albert |
| 4,260,898 A | 4/1981 | Annis |
| 4,267,446 A | 5/1981 | Brown |

(Continued)

FOREIGN PATENT DOCUMENTS

| | | |
|---|---|---|
| CN | 1270318 A | 10/2000 |
| CN | 1493176 A | 4/2004 |

(Continued)

OTHER PUBLICATIONS https://en.wikipedia.org/wiki/ISM_band#Common_non-ISM_uses., downloaded from Internet Nov. 23, 2020.

(Continued)

*Primary Examiner* — David P Porta
*Assistant Examiner* — Fani Boosalis
(74) *Attorney, Agent, or Firm* — Novel IP

(57) ABSTRACT

The present specification describes a system for synchronizing a transmission detector and a backscatter detector integrated with a portable X-ray scanner. The system includes a transmitter connected with the transmission detector for transmitting the analog detector signal and a receiver connected with the scanner for receiving the transmitted analog detected signal where the transmitter and the receiver operate in the ultra-high frequency range.

32 Claims, 16 Drawing Sheets

(56) References Cited

U.S. PATENT DOCUMENTS

| | | |
|---|---|---|
| 4,315,146 A | 2/1982 | Rudin |
| 4,342,914 A | 8/1982 | Bjorkholm |
| 4,366,382 A | 12/1982 | Kotowski |
| 4,380,817 A | 4/1983 | Harding |
| 4,420,182 A | 12/1983 | Kaneshiro |
| 4,430,568 A | 2/1984 | Yoshida |
| 4,472,822 A | 9/1984 | Swift |
| 4,494,001 A | 1/1985 | Peck |
| 4,497,062 A | 1/1985 | Mistretta |
| 4,503,332 A | 3/1985 | Annis |
| 4,511,799 A | 4/1985 | Bjorkholm |
| 4,525,854 A | 6/1985 | Molbert |
| 4,566,113 A | 1/1986 | Doenges |
| 4,599,740 A | 7/1986 | Cable |
| 4,620,099 A | 10/1986 | Schoenig |
| 4,641,330 A | 2/1987 | Herwig |
| 4,646,339 A | 2/1987 | Rice |
| 4,692,937 A | 9/1987 | Sashin |
| 4,736,401 A | 4/1988 | Donges |
| 4,788,436 A | 11/1988 | Koechner |
| 4,788,704 A | 11/1988 | Donges |
| 4,799,247 A | 1/1989 | Annis |
| 4,809,312 A | 2/1989 | Annis |
| 4,825,454 A | 4/1989 | Annis |
| 4,839,913 A | 6/1989 | Annis |
| 4,864,142 A | 9/1989 | Gomberg |
| 4,870,670 A | 9/1989 | Geus |
| 4,884,289 A | 11/1989 | Glockmann |
| 4,979,202 A | 12/1990 | Siczek |
| 4,991,189 A | 2/1991 | Boomgaarden |
| 5,022,062 A | 6/1991 | Annis |
| 5,056,129 A | 10/1991 | Steinmeyer |
| 5,065,418 A | 11/1991 | Bermbach |
| 5,068,883 A | 11/1991 | DeHaan |
| 5,077,771 A | 12/1991 | Skillicorn |
| 5,091,924 A | 2/1992 | Bermbach |
| 5,098,640 A | 3/1992 | Gozani |
| 5,103,099 A | 4/1992 | Bourdinaud |
| 5,179,581 A | 1/1993 | Annis |
| 5,181,234 A | 1/1993 | Smith |
| 5,182,764 A | 1/1993 | Peschmann |
| 5,224,144 A | 6/1993 | Annis |
| 5,237,598 A | 8/1993 | Albert |
| 5,247,561 A | 9/1993 | Kotowski |
| 5,253,283 A | 10/1993 | Annis |
| 5,281,820 A | 1/1994 | Groh |
| 5,302,817 A | 4/1994 | Yokota |
| 5,313,511 A | 5/1994 | Annis |
| 5,319,547 A | 6/1994 | Krug |
| 5,338,927 A | 8/1994 | De Groot |
| 5,343,046 A | 8/1994 | Smith |
| 5,367,552 A | 11/1994 | Peschmann |
| 5,376,795 A | 12/1994 | Hasegawa |
| 5,379,334 A | 1/1995 | Zimmer |
| 5,391,878 A | 2/1995 | Petroff |
| 5,394,454 A | 2/1995 | Harding |
| 5,420,959 A | 5/1995 | Walker |
| 5,430,787 A | 7/1995 | Norton |
| 5,446,288 A | 8/1995 | Tumer |
| 5,493,596 A | 2/1996 | Annis |
| 5,524,133 A | 6/1996 | Neale |
| 5,548,123 A | 8/1996 | Perez-Mendez |
| 5,550,380 A | 8/1996 | Sugawara |
| 5,600,144 A | 2/1997 | Worstell |
| 5,600,303 A | 2/1997 | Husseiny |
| 5,600,700 A | 2/1997 | Krug |
| 5,629,515 A | 5/1997 | Maekawa |
| 5,629,523 A | 5/1997 | Ngo |
| 5,638,420 A | 6/1997 | Armistead |
| 5,642,393 A | 6/1997 | Krug |
| 5,642,394 A | 6/1997 | Rothschild |
| 5,665,969 A | 9/1997 | Beusch |
| 5,666,393 A | 9/1997 | Annis |
| 5,687,210 A | 11/1997 | Maitrejean |
| 5,692,028 A | 11/1997 | Geus |
| 5,692,029 A | 11/1997 | Husseiny |
| 5,696,806 A | 12/1997 | Grodzins |
| 5,734,166 A | 3/1998 | Czirr |
| 5,751,837 A | 5/1998 | Watanabe |
| 5,763,886 A | 6/1998 | Schulte |
| 5,764,683 A | 6/1998 | Swift |
| 5,768,334 A | 6/1998 | Maitrejean |
| 5,783,829 A | 7/1998 | Sealock |
| 5,784,507 A | 7/1998 | Holm-Kennedy |
| 5,787,145 A | 7/1998 | Geus |
| 5,805,660 A | 9/1998 | Perion |
| 5,838,759 A | 11/1998 | Armistead |
| 5,856,673 A | 1/1999 | Ikegami |
| 5,866,907 A * | 2/1999 | Drukier .............. G01T 1/2008 250/366 |
| 5,903,623 A | 5/1999 | Swift |
| 5,910,973 A | 6/1999 | Grodzins |
| 5,930,326 A | 7/1999 | Rothschild |
| 5,936,240 A | 8/1999 | Dudar |
| 5,940,468 A | 8/1999 | Huang |
| 5,968,425 A | 10/1999 | Bross |
| 5,974,111 A | 10/1999 | Krug |
| 6,018,562 A | 1/2000 | Willson |
| 6,031,890 A | 2/2000 | Bermbach |
| 6,055,111 A | 4/2000 | Nomura |
| 6,058,158 A | 5/2000 | Eiler |
| 6,067,344 A | 5/2000 | Grodzins |
| 6,078,052 A | 6/2000 | Difilippo |
| 6,081,580 A | 6/2000 | Grodzins |
| 6,094,472 A | 7/2000 | Smith |
| 6,151,381 A | 11/2000 | Grodzins |
| 6,188,747 B1 | 2/2001 | Geus |
| 6,192,101 B1 | 2/2001 | Grodzins |
| 6,192,104 B1 | 2/2001 | Adams |
| 6,195,413 B1 | 2/2001 | Geus |
| 6,198,795 B1 | 3/2001 | Naumann |
| 6,203,846 B1 | 3/2001 | Ellingson |
| 6,212,251 B1 | 4/2001 | Tomura |
| 6,218,943 B1 | 4/2001 | Ellenbogen |
| 6,236,709 B1 | 5/2001 | Perry |
| 6,249,567 B1 | 6/2001 | Rothschild |
| 6,252,929 B1 | 6/2001 | Swift |
| 6,256,369 B1 | 7/2001 | Lai |
| 6,278,115 B1 | 8/2001 | Annis |
| 6,282,260 B1 | 8/2001 | Grodzins |
| 6,292,533 B1 | 9/2001 | Swift |
| 6,301,326 B2 | 10/2001 | Bjorkholm |
| 6,320,933 B1 | 11/2001 | Grodzins |
| 6,333,502 B1 | 12/2001 | Sumita |
| 6,356,620 B1 | 3/2002 | Rothschild |
| 6,421,420 B1 | 7/2002 | Grodzins |
| 6,424,695 B1 | 7/2002 | Grodzins |
| 6,434,219 B1 | 8/2002 | Rothschild |
| 6,435,715 B1 | 8/2002 | Betz |
| 6,442,233 B1 | 8/2002 | Grodzins |
| 6,445,765 B1 | 9/2002 | Frank |
| 6,453,003 B1 | 9/2002 | Springer |
| 6,453,007 B2 | 9/2002 | Adams |
| 6,456,684 B1 | 9/2002 | Mun |
| 6,459,761 B1 | 10/2002 | Grodzins |
| 6,459,764 B1 | 10/2002 | Chalmers |
| 6,473,487 B1 | 10/2002 | Le |
| RE37,899 E | 11/2002 | Grodzins |
| 6,483,894 B2 | 11/2002 | Hartick |
| 6,507,025 B1 | 1/2003 | Verbinski |
| 6,532,276 B1 | 3/2003 | Hartick |
| 6,542,574 B2 | 4/2003 | Grodzins |
| 6,542,578 B2 | 4/2003 | Ries |
| 6,542,580 B1 | 4/2003 | Carver |
| 6,543,599 B2 | 4/2003 | Jasinetzky |
| 6,546,072 B1 | 4/2003 | Chalmers |
| 6,552,346 B2 | 4/2003 | Verbinski |
| 6,556,653 B2 | 4/2003 | Hussein |
| 6,563,903 B2 | 5/2003 | Kang |
| 6,567,496 B1 | 5/2003 | Sychev |
| 6,580,778 B2 | 6/2003 | Meder |
| 6,584,170 B2 | 6/2003 | Aust |
| 6,597,760 B2 | 7/2003 | Beneke |
| 6,606,516 B2 | 8/2003 | Levine |

(56) References Cited

U.S. PATENT DOCUMENTS

| | | |
|---|---|---|
| 6,621,888 B2 | 9/2003 | Grodzins |
| 6,636,581 B2 | 10/2003 | Sorenson |
| 6,637,266 B1 | 10/2003 | Froom |
| 6,645,656 B1 | 11/2003 | Chen |
| 6,645,657 B2 | 11/2003 | Huang |
| 6,653,588 B1 | 11/2003 | Gillard-Hickman |
| 6,658,087 B2 | 12/2003 | Chalmers |
| 6,663,280 B2 | 12/2003 | Doenges |
| 6,665,373 B1 | 12/2003 | Kotowski |
| 6,665,433 B2 | 12/2003 | Roder |
| 6,687,326 B1 | 2/2004 | Bechwati |
| 6,747,705 B2 | 6/2004 | Peters |
| 6,763,635 B1 | 7/2004 | Lowman |
| 6,785,357 B2 | 8/2004 | Bernardi |
| 6,812,426 B1 | 11/2004 | Kotowski |
| 6,816,571 B2 | 11/2004 | Bijjani |
| 6,837,422 B1 | 1/2005 | Meder |
| 6,839,403 B1 | 1/2005 | Kotowski |
| 6,843,599 B2 | 1/2005 | Le |
| 6,859,607 B2 | 2/2005 | Sugihara |
| 6,876,719 B2 | 4/2005 | Ozaki |
| 6,879,657 B2 | 4/2005 | Hoffman |
| 6,909,770 B2 | 6/2005 | Schramm |
| 6,920,197 B2 | 7/2005 | Kang |
| 6,965,662 B2 | 11/2005 | Eppler |
| 7,010,094 B2 | 3/2006 | Grodzins |
| 7,039,159 B2 | 5/2006 | Muenchau |
| 7,067,079 B2 | 6/2006 | Bross |
| 7,072,440 B2 | 7/2006 | Mario |
| 7,099,434 B2 | 8/2006 | Adams |
| 7,103,137 B2 | 9/2006 | Seppi |
| 7,110,493 B1 | 9/2006 | Kotowski |
| 7,115,875 B1 | 10/2006 | Worstell |
| RE39,396 E | 11/2006 | Swift |
| 7,162,005 B2 | 1/2007 | Bjorkholm |
| 7,203,276 B2 | 4/2007 | Arsenault |
| 7,207,713 B2 | 4/2007 | Lowman |
| 7,215,737 B2 | 5/2007 | Li |
| 7,217,929 B2 | 5/2007 | Hirai |
| 7,218,704 B1 | 5/2007 | Adams |
| 7,253,727 B2 | 8/2007 | Jenkins |
| 7,308,076 B2 | 12/2007 | Studer |
| 7,322,745 B2 | 1/2008 | Agrawal |
| 7,326,933 B2 | 2/2008 | Katagiri |
| 7,333,587 B2 | 2/2008 | De |
| 7,366,282 B2 | 4/2008 | Peschmann |
| 7,369,463 B1 | 5/2008 | Van Dullemen |
| 7,369,643 B2 | 5/2008 | Kotowski |
| 7,379,530 B2 | 5/2008 | Hoff |
| 7,400,701 B1 | 7/2008 | Cason |
| 7,409,042 B2 | 8/2008 | Bertozzi |
| 7,417,440 B2 | 8/2008 | Peschmann |
| 7,486,768 B2 | 2/2009 | Allman |
| 7,505,556 B2 | 3/2009 | Chalmers |
| 7,505,562 B2 | 3/2009 | Dinca |
| 7,508,910 B2 | 3/2009 | Safai |
| 7,517,149 B2 | 4/2009 | Agrawal |
| 7,519,148 B2 | 4/2009 | Kotowski |
| 7,538,325 B2 | 5/2009 | Mishin |
| 7,551,715 B2 | 6/2009 | Rothschild |
| 7,551,718 B2 | 6/2009 | Rothschild |
| 7,555,099 B2 | 6/2009 | Rothschild |
| 7,579,845 B2 | 8/2009 | Peschmann |
| 7,593,506 B2 | 9/2009 | Cason |
| 7,593,510 B2 | 9/2009 | Rothschild |
| 7,720,195 B2 | 5/2010 | Allman |
| 7,742,568 B2 | 6/2010 | Smith |
| 7,783,004 B2 | 8/2010 | Kotowski |
| 7,783,005 B2 | 8/2010 | Kaval |
| 7,796,733 B2 | 9/2010 | Hughes |
| 7,796,734 B2 | 9/2010 | Mastronardi |
| 7,809,109 B2 | 10/2010 | Mastronardi |
| 7,817,776 B2 | 10/2010 | Agrawal |
| 7,856,081 B2 | 12/2010 | Peschmann |
| 7,864,920 B2 | 1/2011 | Rothschild |
| 7,876,880 B2 | 1/2011 | Kotowski |
| 7,924,979 B2 | 4/2011 | Rothschild |
| 7,963,695 B2 | 6/2011 | Kotowski |
| 7,995,705 B2 | 8/2011 | Allman |
| 7,995,707 B2 | 8/2011 | Rothschild |
| 8,000,436 B2 | 8/2011 | Seppi |
| 8,054,938 B2 | 11/2011 | Kaval |
| 8,135,110 B2 | 3/2012 | Morton |
| 8,135,112 B2 | 3/2012 | Hughes |
| 8,138,770 B2 | 3/2012 | Peschmann |
| 8,148,693 B2 | 4/2012 | Ryge |
| 8,194,822 B2 | 6/2012 | Rothschild |
| 8,199,996 B2 | 6/2012 | Hughes |
| 8,275,091 B2 | 9/2012 | Morton |
| 8,275,092 B1 | 9/2012 | Zhang |
| 8,325,871 B2 | 12/2012 | Grodzins |
| 8,331,535 B2 | 12/2012 | Morton |
| 8,345,819 B2 | 1/2013 | Mastronardi |
| 8,389,942 B2 | 3/2013 | Morton |
| 8,401,147 B2 | 3/2013 | Ryge |
| 8,428,217 B2 | 4/2013 | Peschmann |
| 8,433,036 B2 | 4/2013 | Morton |
| 8,439,565 B2 | 5/2013 | Mastronardi |
| 8,442,186 B2 | 5/2013 | Rothschild |
| 8,451,974 B2 | 5/2013 | Morton |
| 8,457,274 B2 | 6/2013 | Arodzero |
| 8,483,356 B2 | 7/2013 | Bendahan |
| 8,503,605 B2 | 8/2013 | Morton |
| 8,503,606 B2 | 8/2013 | Rothschild |
| 8,532,823 B2 | 9/2013 | McElroy |
| 8,576,982 B2 | 11/2013 | Gray |
| 8,582,720 B2 | 11/2013 | Morton |
| 8,605,859 B2 | 12/2013 | Mastronardi |
| 8,638,904 B2 | 1/2014 | Gray |
| 8,668,386 B2 | 3/2014 | Morton |
| 8,690,427 B2 | 4/2014 | Mastronardi |
| 8,731,137 B2 | 5/2014 | Arroyo |
| 8,735,833 B2 | 5/2014 | Morto |
| 8,750,452 B2 | 6/2014 | Kaval |
| 8,750,454 B2 | 6/2014 | Gozani |
| 8,774,357 B2 | 7/2014 | Morton |
| 8,774,362 B2 | 7/2014 | Hughes |
| 8,798,232 B2 | 8/2014 | Bendahan |
| 8,804,899 B2 | 8/2014 | Morton |
| 8,824,632 B2 | 9/2014 | Mastronardi |
| 8,831,176 B2 | 9/2014 | Morto |
| 8,842,808 B2 | 9/2014 | Rothschild |
| 8,861,684 B2 | 10/2014 | Al-Kofahi |
| 8,884,236 B2 | 11/2014 | Rothschild |
| 8,885,794 B2 | 11/2014 | Morton |
| 8,903,045 B2 | 12/2014 | Schubert |
| 8,903,046 B2 | 12/2014 | Morton |
| 8,908,831 B2 | 12/2014 | Bendahan |
| 8,923,481 B2 | 12/2014 | Schubert |
| 8,929,509 B2 | 1/2015 | Morton |
| 8,958,526 B2 | 2/2015 | Morton |
| 8,971,487 B2 | 3/2015 | Mastronardi |
| 8,993,970 B2 | 3/2015 | Morton |
| 8,995,619 B2 | 3/2015 | Gray |
| 9,014,339 B2 | 4/2015 | Grodzins |
| 9,020,100 B2 | 4/2015 | Mastronardi |
| 9,020,103 B2 | 4/2015 | Grodzins |
| 9,042,511 B2 | 5/2015 | Peschmann |
| 9,052,271 B2 | 6/2015 | Grodzins |
| 9,052,403 B2 | 6/2015 | Morton |
| 9,057,679 B2 | 6/2015 | Morton |
| 9,069,101 B2 | 6/2015 | Arroyo, Jr. |
| 9,099,279 B2 | 8/2015 | Rommel |
| 9,117,564 B2 | 8/2015 | Rommel |
| 9,121,958 B2 | 9/2015 | Morton |
| 9,128,198 B2 | 9/2015 | Morton |
| 9,146,201 B2 | 9/2015 | Schubert |
| 9,158,030 B2 | 10/2015 | Morton |
| 9,182,516 B2 | 11/2015 | Gray |
| 9,183,647 B2 | 11/2015 | Morton |
| 9,207,195 B2 | 12/2015 | Gozani |
| 9,208,988 B2 | 12/2015 | Morton |
| 9,223,050 B2 | 12/2015 | Kaval |
| 9,251,915 B2 | 2/2016 | Lai |

(56) References Cited

U.S. PATENT DOCUMENTS

| | | |
|---|---|---|
| 9,257,208 B2 | 2/2016 | Rommel |
| 9,268,058 B2 | 2/2016 | Peschmann |
| 9,285,325 B2 | 3/2016 | Gray |
| 9,285,488 B2 | 3/2016 | Arodzero |
| 9,291,582 B2 | 3/2016 | Grodzins |
| 9,291,741 B2 | 3/2016 | Gray |
| 9,306,673 B1 | 4/2016 | Macrae |
| 9,316,760 B2 | 4/2016 | Bendahan |
| 9,417,060 B1 | 8/2016 | Schubert |
| 9,465,135 B2 | 10/2016 | Morton |
| 9,466,456 B2 | 10/2016 | Rommel |
| 9,535,019 B1 | 1/2017 | Rothschild |
| 9,541,510 B2 | 1/2017 | Arodzero |
| 9,562,866 B2 | 2/2017 | Morton |
| 9,576,766 B2 | 2/2017 | Morton |
| 9,606,245 B1 * | 3/2017 | Czarnecki ............ G01T 1/1642 |
| 9,606,259 B2 | 3/2017 | Morton |
| 9,632,205 B2 | 4/2017 | Morton |
| 9,658,343 B2 | 5/2017 | Arodzero |
| 9,791,590 B2 | 10/2017 | Morton |
| 9,823,201 B2 | 11/2017 | Morton |
| 9,841,386 B2 | 12/2017 | Grodzins |
| 9,915,752 B2 | 3/2018 | Peschmann |
| 9,958,569 B2 | 5/2018 | Morton |
| 10,134,254 B2 | 11/2018 | Jarvi |
| 10,168,445 B2 | 1/2019 | Morton |
| 10,209,372 B2 | 2/2019 | Arodzero |
| 10,228,487 B2 | 3/2019 | Mastronardi |
| 10,266,999 B2 | 4/2019 | Rothschild |
| 10,295,483 B2 | 5/2019 | Morton |
| 10,408,967 B2 | 9/2019 | Morton |
| 10,670,740 B2 | 6/2020 | Couture |
| 10,724,192 B2 | 7/2020 | Rothschild |
| 10,762,998 B2 | 9/2020 | Rothschild |
| 10,770,195 B2 | 9/2020 | Rothschild |
| 10,794,843 B2 | 10/2020 | Rothschild |
| 10,830,911 B2 | 11/2020 | Couture |
| 10,976,465 B2 | 4/2021 | Morton |
| 2001/0016028 A1 | 8/2001 | Adams |
| 2001/0046275 A1 | 11/2001 | Hussein |
| 2002/0082492 A1 | 6/2002 | Grzeszczuk |
| 2002/0117625 A1 | 8/2002 | Pandelisev |
| 2002/0121604 A1 | 9/2002 | Katagiri |
| 2003/0223549 A1 | 12/2003 | Winsor |
| 2004/0004482 A1 | 1/2004 | Bouabdo |
| 2004/0057554 A1 | 3/2004 | Bjorkholm |
| 2004/0086078 A1 | 5/2004 | Adams |
| 2004/0104347 A1 | 6/2004 | Bross |
| 2004/0109653 A1 | 6/2004 | Kerr |
| 2004/0140431 A1 | 7/2004 | Schmand |
| 2004/0141584 A1 | 7/2004 | Bernardi |
| 2004/0218714 A1 | 11/2004 | Faust |
| 2004/0251415 A1 | 12/2004 | Verbinski |
| 2004/0256565 A1 | 12/2004 | Adams |
| 2005/0018814 A1 | 1/2005 | Kerschner |
| 2005/0053199 A1 | 3/2005 | Miles |
| 2005/0073740 A1 | 4/2005 | Phillips |
| 2005/0078793 A1 | 4/2005 | Ikeda |
| 2005/0135560 A1 | 6/2005 | Dafni |
| 2005/0185757 A1 | 8/2005 | Kresse |
| 2005/0190878 A1 | 9/2005 | De Man |
| 2005/0236577 A1 | 10/2005 | Katagiri |
| 2006/0078091 A1 | 4/2006 | Lasiuk |
| 2006/0251211 A1 | 11/2006 | Grodzins |
| 2007/0009088 A1 | 1/2007 | Edic |
| 2007/0019781 A1 | 1/2007 | Haras |
| 2007/0029493 A1 | 2/2007 | Kniss |
| 2007/0098142 A1 | 5/2007 | Rothschild |
| 2007/0222981 A1 | 9/2007 | Ponsardin |
| 2007/0235655 A1 | 10/2007 | Rhiger |
| 2007/0237294 A1 | 10/2007 | Hoff |
| 2007/0258562 A1 | 11/2007 | Dinca |
| 2007/0280417 A1 | 12/2007 | Kang |
| 2008/0037707 A1 | 2/2008 | Rothschild |
| 2008/0043913 A1 | 2/2008 | Annis |
| 2008/0099692 A1 | 5/2008 | Poreira |
| 2008/0152081 A1 | 6/2008 | Cason |
| 2008/0197279 A1 | 8/2008 | Kang |
| 2008/0219804 A1 | 9/2008 | Chattey |
| 2008/0273652 A1 | 11/2008 | Arnold |
| 2009/0067575 A1 | 3/2009 | Seppi |
| 2009/0086907 A1 | 4/2009 | Smith |
| 2009/0103686 A1 | 4/2009 | Rothschild |
| 2009/0116617 A1 | 5/2009 | Mastronardi |
| 2009/0188379 A1 | 7/2009 | Hiza |
| 2009/0230295 A1 | 9/2009 | Waring |
| 2009/0230925 A1 | 9/2009 | Nathan |
| 2009/0257555 A1 * | 10/2009 | Chalmers ............... G01N 23/20 378/57 |
| 2009/0268871 A1 | 10/2009 | Rothschild |
| 2009/0274270 A1 | 11/2009 | Kotowski |
| 2009/0309034 A1 | 12/2009 | Yoshida |
| 2010/0061509 A1 | 3/2010 | Raymond |
| 2010/0069721 A1 | 3/2010 | Webler |
| 2010/0072398 A1 | 3/2010 | Fruehauf |
| 2010/0108859 A1 | 5/2010 | Andressen |
| 2010/0270462 A1 | 10/2010 | Nelson |
| 2010/0276602 A1 | 11/2010 | Clothier |
| 2011/0079726 A1 | 4/2011 | Kusner |
| 2011/0110490 A1 | 5/2011 | Samant |
| 2011/0206179 A1 | 8/2011 | Bendahan |
| 2011/0215222 A1 | 9/2011 | Eminoglu |
| 2011/0309253 A1 | 12/2011 | Rothschild |
| 2011/0309257 A1 | 12/2011 | Menge |
| 2012/0033791 A1 | 2/2012 | Mastronardi |
| 2012/0061575 A1 | 3/2012 | Dunleavy |
| 2012/0076257 A1 | 3/2012 | Star-Lack |
| 2012/0104265 A1 | 5/2012 | Workman |
| 2012/0147987 A1 | 6/2012 | Calderbank |
| 2012/0148020 A1 | 6/2012 | Arroyo, Jr. |
| 2012/0199753 A1 | 8/2012 | Chuang |
| 2012/0241628 A1 | 9/2012 | Hesser |
| 2012/0280132 A1 | 11/2012 | Nakamura |
| 2012/0298864 A1 | 11/2012 | Morishita |
| 2013/0039463 A1 | 2/2013 | Mastronardi |
| 2013/0156156 A1 | 6/2013 | Roe |
| 2013/0195248 A1 | 8/2013 | Rothschild |
| 2013/0202089 A1 | 8/2013 | Schubert |
| 2013/0208857 A1 | 8/2013 | Arodzero |
| 2013/0315368 A1 | 11/2013 | Turner |
| 2014/0105367 A1 | 4/2014 | Horvarth |
| 2014/0133631 A1 | 5/2014 | Wood |
| 2014/0182373 A1 | 7/2014 | Sbihli |
| 2015/0016794 A1 | 1/2015 | Mori |
| 2015/0055751 A1 | 2/2015 | Funk |
| 2015/0060673 A1 | 3/2015 | Zimdars |
| 2015/0168589 A1 | 6/2015 | Morton |
| 2016/0025888 A1 | 1/2016 | Peschmann |
| 2016/0025889 A1 | 1/2016 | Morton |
| 2016/0033426 A1 | 2/2016 | Georgeson |
| 2016/0106384 A1 | 4/2016 | Park |
| 2016/0170044 A1 * | 6/2016 | Arodzero ................. G01T 3/06 250/362 |
| 2016/0170077 A1 | 6/2016 | Morton |
| 2016/0223706 A1 | 8/2016 | Franco |
| 2017/0023695 A1 | 1/2017 | Zhang |
| 2017/0045630 A1 | 2/2017 | Simon |
| 2017/0059739 A1 | 3/2017 | Mastronardi |
| 2017/0184516 A1 | 6/2017 | Chen |
| 2017/0245819 A1 | 8/2017 | Rothschild |
| 2017/0299526 A1 | 10/2017 | Morton |
| 2017/0299764 A1 | 10/2017 | Morton |
| 2017/0315242 A1 | 11/2017 | Arodzero |
| 2017/0358380 A1 | 12/2017 | Rothschild |
| 2018/0038969 A1 | 2/2018 | McCollough |
| 2018/0038988 A1 | 2/2018 | Morton |
| 2018/0128935 A1 | 5/2018 | Morton |
| 2018/0136340 A1 | 5/2018 | Nelson |
| 2018/0252841 A1 | 9/2018 | Grodzins |
| 2018/0284316 A1 | 10/2018 | Morton |
| 2018/0286624 A1 | 10/2018 | Rommel |
| 2018/0294066 A1 | 10/2018 | Rothschild |
| 2018/0313770 A1 | 11/2018 | Morton |
| 2018/0328861 A1 | 11/2018 | Grodzins |

(56) References Cited

U.S. PATENT DOCUMENTS

| | | |
|---|---|---|
| 2019/0139385 A1 | 5/2019 | Jarvi |
| 2019/0293810 A1 | 9/2019 | Couture |
| 2019/0346382 A1 | 11/2019 | Rothschild |
| 2019/0383953 A1 | 12/2019 | Arodzero |
| 2019/0391280 A1 | 12/2019 | Couture |
| 2020/0025955 A1 | 1/2020 | Gozani |
| 2020/0033274 A1 | 1/2020 | Couture |
| 2020/0073008 A1 | 3/2020 | Parikh |
| 2020/0103357 A1 | 4/2020 | Morton |
| 2020/0103547 A1 | 4/2020 | Morton |
| 2020/0158908 A1 | 5/2020 | Morton |
| 2020/0191991 A1 | 6/2020 | Morton |
| 2020/0233100 A1 | 7/2020 | Rothschild |
| 2020/0326291 A1 | 10/2020 | Rothschild |
| 2020/0326436 A1 | 10/2020 | Couture |
| 2020/0355631 A1 | 11/2020 | Yu |
| 2020/0355632 A1 | 11/2020 | Morton |
| 2021/0018650 A1 | 1/2021 | Morton |
| 2021/0132239 A1 | 5/2021 | Couture |

FOREIGN PATENT DOCUMENTS

| | | |
|---|---|---|
| CN | 1745296 A | 3/2006 |
| CN | 101142497 A | 3/2008 |
| CN | 101166469 A | 4/2008 |
| CN | 101578534 A | 11/2009 |
| CN | 102519988 A | 6/2012 |
| CN | 104204854 A | 12/2014 |
| CN | 107193034 A | 9/2017 |
| CN | 107209282 A | 9/2017 |
| DE | 2639631 A1 | 3/1978 |
| DE | 4017100 A1 | 12/1990 |
| DE | 102013102749 A1 | 10/2013 |
| EP | 113291 A1 | 7/1984 |
| EP | 0261984 A2 | 3/1988 |
| EP | 0813692 | 12/1997 |
| EP | 0813692 A1 | 12/1997 |
| EP | 0864884 A2 | 9/1998 |
| EP | 0971215 A1 | 1/2000 |
| EP | 1168249 A1 | 1/2002 |
| EP | 1135700 | 3/2005 |
| EP | 1254384 | 1/2008 |
| EP | 2054741 | 5/2009 |
| EP | 1733213 | 2/2010 |
| EP | 2049888 | 5/2014 |
| EP | 3271709 A1 | 1/2018 |
| FR | 2492159 | 4/1982 |
| GB | 1505498 A | 3/1978 |
| GB | 2084829 A | 4/1982 |
| GB | 2150526 A | 7/1985 |
| GB | 2277013 A | 10/1994 |
| GB | 2400480 A | 10/2004 |
| GB | 2482024 A | 1/2012 |
| JP | 58103678 | 6/1983 |
| JP | 62147349 A | 7/1987 |
| JP | S63299100 | 12/1988 |
| JP | 10232284 A | 2/1997 |
| JP | H09318757 A | 12/1997 |
| JP | H10185842 | 7/1998 |
| JP | 2000515629 | 11/2000 |
| JP | 2002071816 A | 3/2002 |
| JP | 2004045250 A | 2/2004 |
| JP | 2006505805 | 2/2006 |
| JP | 2013205122 | 10/2013 |
| JP | 3195776 | 2/2015 |
| WO | 9701089 | 1/1997 |
| WO | 1997001089 A1 | 1/1997 |
| WO | 9802763 A | 1/1998 |
| WO | 1998003889 A1 | 1/1998 |
| WO | 9805946 A1 | 2/1998 |
| WO | 1998020366 A1 | 5/1998 |
| WO | 9913323 A2 | 3/1999 |
| WO | 1999039189 A2 | 8/1999 |
| WO | 2000033060 | 6/2000 |
| WO | 2000037928 A2 | 6/2000 |
| WO | 0159485 A1 | 8/2001 |
| WO | 0173415 A2 | 10/2001 |
| WO | 02091023 A2 | 11/2002 |
| WO | 03075037 A1 | 9/2003 |
| WO | 2004010127 A1 | 1/2004 |
| WO | 2004043740 A2 | 5/2004 |
| WO | 2005079437 A2 | 9/2005 |
| WO | 2005098400 A2 | 10/2005 |
| WO | 2005103759 | 11/2005 |
| WO | 2005103759 A1 | 11/2005 |
| WO | 2006111323 | 10/2006 |
| WO | 2006111323 A2 | 10/2006 |
| WO | 2006137932 A2 | 12/2006 |
| WO | 2007051092 A2 | 5/2007 |
| WO | 2008021807 A2 | 2/2008 |
| WO | 2008024825 A2 | 2/2008 |
| WO | 2008063695 A2 | 5/2008 |
| WO | 2008105782 A2 | 9/2008 |
| WO | 2009027667 A2 | 3/2009 |
| WO | 2009067394 A2 | 5/2009 |
| WO | 2010129926 A1 | 11/2010 |
| WO | 2011008718 A1 | 1/2011 |
| WO | 2011011583 A1 | 1/2011 |
| WO | 2011014445 A1 | 2/2011 |
| WO | 2011053972 A1 | 5/2011 |
| WO | 2011149566 A2 | 12/2011 |
| WO | 2011163108 | 12/2011 |
| WO | 2011163108 A2 | 12/2011 |
| WO | 2012058207 A2 | 5/2012 |
| WO | 2012109307 A1 | 8/2012 |
| WO | 2012142453 A2 | 10/2012 |
| WO | 2012142456 A2 | 10/2012 |
| WO | 2012174265 A1 | 12/2012 |
| WO | 2013112819 A1 | 8/2013 |
| WO | 2013116058 A1 | 8/2013 |
| WO | 2013122763 A1 | 8/2013 |
| WO | 2014058495 A2 | 4/2014 |
| WO | 2016003547 A1 | 1/2016 |
| WO | 2016081881 A1 | 5/2016 |
| WO | 2018064434 | 4/2018 |
| WO | 2019217596 A1 | 11/2019 |
| WO | 2020041161 A1 | 2/2020 |

OTHER PUBLICATIONS

International Search Report for PCT/US17/54211, dated Jan. 18, 2018.

International Search Report for PCT/US2019/027242, dated Jul. 17, 2019.

Rose, Kathryn, "NuMI Off-Axis Experiment" Datasheet (online). University of Oxford & Rutherford Appleton Laboratory, 2003. <URL: https://slideplayer.com/slide/8765673/>.

Williams et al.:"PET Detector Using Waveshifting Optical Fibers and Microchannel Plate PMT with Delay Line Readout", IEEE Transactions on Nuclear Science, IEEE Service Center, New York, NY, US, vol. 45, No. 2, Apr. 1, 1998 (Apr. 1, 1998), pp. 195-205, XP011087844, ISSN: 0018-9499, DOI: 10.1109/23.664171.

Beznosko et al., "FNAL-NICADD Extruded Scintillator," FERMILAB-CONF-04-216-E, pp. 1-4 (Sep. 2004).

Case et al., "Wavelength-shifting fiber readout of LaCl3 and LaBr3 scintillators," Proc. of SPIE, vol. 5898, UV, X-Ray, and Gamma-Ray Space Instrumentation for Astronomy XIV, pp. 58980K-1-58980K-8 (2005).

Gundiah, "Scintillation properties of Eu.sup.2+-activated barium fluoroiodide," Lawrence Berkeley National Laboratory, pp. 1-10 (Feb. 2011).

Hutchinson et al., "Optical Readout for Imaging Neutron Scintillation Detectors," Engineering Science and Technology Division, Oak Ridge National Laboratory, Oak Ridge, Tennessee, 6 pages. (Nov. 2002).

Keizer, "The optimal cosmic ray detector for High-Schools," 21 pages (2011).

Maekawa et al., "Thin Beta-ray Detectors using Plastic Scintillator Combined with Wavelength-shifting Fibers for Surface Contamination Monitoring," J. Nucl. Sci. Technol., vol. 35, No. 12, pp. 886-894 (Dec. 1998).

(56) References Cited

OTHER PUBLICATIONS

Moiseev et al., "High-efficiency plastic scintillator detector with wavelength-shifting fiber readout for the GLAST Large Area Telescope," Nucl. Instrum. Meth. Phys. Res. A, vol. 583, pp. 372-381 (2007).
Nishikido et al. "X-ray detector made of plastic scintillators and WLS fiber for real-time dose distribution monitoring in interventional radiology," IEEE Nuclear Science Symposium and Medical Imaging Conference Record.
Pla-Dalmau et al., "Extruded Plastic Scintillator for MINERvA," FERMILAB-CONF-05-506-E, pp. 1298-1300 (2005).
Yoshimura et al., "Plastic scintillator produced by the injection-molding technique," Nucl. Instr. Meth. Phys. Res. A, vol. 406, pp. 435-441 (1998).
Jae Yul Ahn, Authorized officer Korean Intellectual Property Office, International Search Report-Application No. PCT/US2013/024585, dated Jun. 2, 2013, along with Written Opinion of the International Searchi.
International Search Report for PCT/US2013/023125, dated May 15, 2013.
International Search Report for PCT/US2013/024585, dated Jun. 2, 2013.
International Search Report for PCT/US99/29185, dated Sep. 27, 2000.
International Search Report for PCT/US2019/027252, dated Aug. 2, 2019.
Nishikido et al. "X-ray detector made of plastic scintillators and WLS fiber for real-time dose distribution monitoring in interventional radiology," IEEE Nuclear Science Symposium and Medical Imaging Conference Reco, pp. 1272-1274 (2012).
International Search Report for PCT/US2016/023240, dated Jul. 12, 2016.
Nittoh et al., "Discriminated neutron and X-ray radiography using multi-color scintillation detector," Nuclear Instruments and Methods in Physics Research A, vol. 428, pp. 583-588 (1999).
Novikov, "A method for monitoring of Gd concentration in Gd-loaded scintillators," Nuclear Instruments and Methods in Physics Research A, vol. 366, pp. 413-414 (1995).
Osswald et al. "Injection Molding Handbook", p. 394, Chemical Industry Press, Mar. 31, 2005.
Yoshiaki et al. "Development of ultra-high sensitivity bioluminescent enzyme immunoassay for prostate-specific antigen (PSA) using firefly luciferas", Abstract, Luminescence, vol. 16, Issue 4, Jul. 31, 2001.
International Search Report for PCT/US01/09784, dated Jan. 28, 2002.
International Search Report for PCT/US02/13595, dated Aug. 6, 2002.
International Search Report for PCT/US03/35232, dated Nov. 8, 2004.
International Search Report for PCT/US03/05958, dated Jun. 27, 2003.
International Search Report for PCT/US2005/011382, dated Oct. 21, 2005.
International Seach Report for PCT/US2008/083741, dated Oct. 30, 2009.
International Search Report for PCT/US2007/066936, dated Sep. 30, 2008.
International Search Report for PCT/US2006/060158, dated Jul. 5, 2007.
International Search Report for PCT/US2007/076497, dated Jul. 28, 2008.
International Search Report for PCT/US2007/075323, dated Feb. 5, 2008.
International Search Report for PCT/US2010/043201, dated Oct. 29, 2010.
International Search Report for PCT/US2012/024248, dated Jul. 9, 2012.
International Search Report for PCT/US11/23143, dated Nov. 25, 2011.
International Search Report for PCT/US2012/033581, dated Oct. 31, 2012.
International Search Report for PCT/US2011/041033, dated Feb. 17, 2012.
International Search Report for PCT/US2012/033585, dated Nov. 29, 2012.
International Search Report for PCT/US2013/022715, dated May 15, 2013.
International Search Report for PCT/US2015/031115, dated Jul. 29, 2015.
Chou, C, "Fourier coded-aperture imaging in nuclear medicine", IEEE Proc. Sci. Meas. Technol., vol. 141. No. 3, May 1994, pp. 179-184.
Mertz, L.N., et al., "Rotational aperture synthesis for x rays", Journal. Optical Society of America, vol. 3, Dec. 1986, pp. 2167-2170.
International Bureau of WIPO, International Preliminary Report on Patentability, PCT/US2005/011382, dated Oct. 19, 2006, 7 pages.
International Search Report and Written Opinion for PCT/US2010/041757, dated Oct. 12, 2010.
European Patent Office, International Search Report, International Application No. PCT/US99/28266, dated Sep. 6, 2000, 3 pages.
Written Opinion of the International Searching Authority, PCT/US2007/066936, dated Sep. 30, 2008, 7 pages.
International Search Report, PCT/US1999/028035, dated Sep. 15, 2000, 6 pages.
International Search Report, PCT/US1998/18642, dated Jul. 7, 1999, 4 pages.
International Search Report, PCT/US2007/066936; dated: Sep. 30, 2008, 5 pages.
European Patent Office, International Search Report and Written Opinion of the International Searching Authority, PCT/US2005/011382, dated Oct. 21, 2005.
International Search Report for PCT/US20/61866, dated Feb. 11, 2021.

\* cited by examiner

WIRELESS TRANSMISSION DETECTOR PANEL FOR AN X-RAY SCANNER

CROSS-REFERENCE

The present specification relates to U.S. patent application Ser. No. 17/061,340, entitled "Wavelength-Shifting Sheet Scintillation Detectors", filed on Oct. 1, 2020, which is a continuation of U.S. patent application Ser. No. 16/382,973, entitled "Wavelength-Shifting Sheet Scintillation Detectors", filed on Apr. 12, 2019, now issued U.S. Pat. No. 10,830,911, issued on Nov. 10, 2020, which, in turn, relies on U.S. Patent Provisional Application No. 62/687,550, entitled "Wavelength-Shifting Sheet Scintillation Detectors", filed on Jun. 20, 2018, for priority, all of which are herein incorporated by reference in their entirety.

In addition, the present specification relates to U.S. patent application Ser. No. 16/855,683, entitled "Spectral Discrimination Using Wavelength-Shifting Fiber-Coupled Scintillation Detectors", filed on Apr. 22, 2020, which is a continuation of U.S. patent application Ser. No. 16/382,951, filed on Apr. 12, 2019, now issued U.S. Pat. No. 10,670,740, issued on Jun. 2, 2020, which is a continuation-in-part of U.S. patent application Ser. No. 16/242,163, all of which are herein incorporated by reference in their entirety.

In addition, the present specification relates to U.S. patent application Ser. No. 16/242,163, entitled "Spectral Discrimination using Wavelength-Shifting Fiber-Coupled Scintillation Detectors", filed on Jan. 8, 2019, which is a continuation of U.S. patent application Ser. No. 15/490,787, of the same title, filed on Apr. 18, 2017, now issued as U.S. Pat. No. 10,209,372, issued on Feb. 19, 2019, which is a continuation of U.S. patent application Ser. No. 15/050,894, of the same title, filed on Feb. 23, 2016 and issued as U.S. Pat. No. 9,658,343, on May 23, 2017, which, in turn, is a division of U.S. patent application Ser. No. 13/758,189, of the same title, filed on Feb. 4, 2013, and issued as U.S. Pat. No. 9,285,488 on Mar. 15, 2016. U.S. patent application Ser. No. 13/758,189 claims priority from the following applications:

U.S. Patent Provisional Application No. 61/607,066, entitled "X-Ray Inspection using Wavelength-Shifting Fiber-Coupled Detectors", filed on Mar. 6, 2012;

U.S. Patent Provisional Application No. 61/598,521, entitled "Distributed X-Ray Scintillation Detector with Wavelength-Shifted Fiber Readout", and filed on Feb. 14, 2012; and U.S. Patent Provisional Application No. 61/598,576, entitled "X-Ray Inspection Using Wavelength-Shifting Fiber-Coupled Detectors", and filed on Feb. 14, 2012.

The above-mentioned applications are incorporated herein by reference in their entirety.

FIELD

The present specification relates to systems and methods of wirelessly coupling detectors to X-ray scanners and, in particular, wirelessly coupling a transmission detector panel to a backscatter system.

BACKGROUND

Materials, such as narcotics, explosives or currency, and objects, such as weapons or people, are concealed within or behind barriers with the intention that the materials or objects remain undetected by routine or targeted security checks. Scanning devices are well known which use a variety of sensing methods to detect concealed materials and objects. These scanning devices include transmission X-ray imaging systems, Compton scatter-based backscatter imaging systems, chemical sniffing trace detection equipment, thermal imaging camera systems and so on. Such scanning devices may be used alone or in combination to provide a comprehensive level of security. However, such devices tend either to be large and expensive (e.g. transmission X-ray imaging systems) or insensitive to carefully hidden materials (e.g. trace detection equipment and camera systems) which means that their utility is restricted to certain high throughput situations such as sea ports and land borders, airport checkpoints and other areas of the type.

Scatter imaging, in which the X-rays scattered (typically in a general backward direction) by a material, offers several unique inspection capabilities and operational features. Scatter imaging allows images to be obtained even when the imaged object is accessible from only one side. Moreover, since the scatter signal falls off rapidly with increasing depth into the object, backscatter images effectively represent a "slice" of the object characteristic of the side nearest to the X-ray source, thereby reducing problems of image clutter that typically confound transmission images. The Compton effect, which dominates X-ray scatter in certain energy ranges, dominates the interaction of x-rays with dense low-atomic-number (low-Z) materials. Narcotic drugs tend to produce bright signatures in a backscatter image, as do organic explosives, making backscatter imaging a useful imaging modality for bomb or drug detection. Further, in scatter detection, alignment requirements of the x-ray beam with detectors or collimation devices are less exacting, as compared to transmission imaging, thereby enabling rapid deployment in a wide range of inspection scenarios.

With flying-spot technology, it is possible to acquire images using detectors specifically positioned to collect the scattered X-rays. In a typical flying-spot system, a thin "pencil beam" of X-rays is rapidly and repetitively swept through a source-centered, vertically-oriented "fan" of beam paths that are arranged to intercept the object under inspection. At the same time, the object is moved at a constant, yet slower speed along a path perpendicular to the fan, on a horizontally moving conveyor belt, for example. The pencil beam traverses the object in point-by-point raster fashion, and the entire object is scanned as it passes through the fan plane over a period ranging from a few seconds to a few minutes depending upon the length of the object.

Although the total scan time may be seconds to minutes in duration, the actual exposure time of any part of the scanned object is only the brief time it takes for the pencil beam to sweep across a given pixel. That exposure time is typically in the range of microseconds, depending on the design and the application, and yields an entrance exposure to the scanned object that constitutes a low dose to the object. This also means that there is little radiation available to scatter into the environment, therefore the doses to operators and other bystanders is correspondingly low.

U.S. Pat. No. 10,168,445, assigned to Applicant of the present specification, discloses a compact, light-weight, portable and hand-held system or device that can be maneuvered to reach relatively inaccessible locations and scan behind concealing barriers that are otherwise opaque against chemical and optical probes. The disclosed system is a compact, hand-held device that uses the principle of X-ray backscatter to provide immediate feedback to an operator about the presence of scattering and absorbing materials, items or objects behind concealing barriers irradiated by ionizing radiation, such as X-rays. Feedback is provided in the form of a changing audible tone whereby the pitch or frequency of the tone varies depending on the type of scattering material, item or object. The operator obtains a visual scan image on a screen by scanning the beam around a suspect area or anomaly.

Scanning pencil beams of X-rays in such devices not only reveal interior objects by analyzing the backscattered radiation but, in some applications, can obtain additional information by the simultaneous analysis of transmission (TX) and backscattered (BX) radiation. In this configuration, the handheld device comprises one or more BX detectors while a TX detector is placed at a distance from the scanner and is in wired communication with the handheld device. The transmission detector is coupled with the scanner by using power and signal cables in order to synchronize the BX detector of the scanner and the transmission detector. In practice, however, it is very cumbersome to properly position the transmission detector relative to the backscatter system since the distance between the scanner and the transmission detector panel may be large and cables extending through this distance may be cumbersome, difficult to manage and cause delays or inefficiencies in the scanning process. Unfortunately, there are no practical alternative approaches to wired transmission detectors because of the need for a high degree of signal synchronization and the inherent latency that exists in known wireless approaches.

Hence, there is a need for systems and methods for wirelessly coupling an X-ray scanner comprising a backscatter detector with a transmission detector placed at a distance from the scanner. There is a need for systems and methods for ensuring a high degree of synchronization with wireless signals in an X-ray scanner comprising a backscatter detector with a wireless transmission detector placed at a distance from the scanner.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification discloses an X-ray scanner, comprising: a housing; an X-ray source positioned in the housing; a backscatter detector physically coupled to the housing system; a transmission detector adapted to be positioned remote from the housing and not physically coupled to the housing, wherein the transmission detector is adapted to generate a signal when X-rays emitted by the X-ray source impinge on a surface of the transmitter detector after passing through an object being scanned and wherein the transmission detector further comprises a wireless transmitter for transmitting the signal; and a controller physically coupled to the housing and adapted to control an operation of the X-ray source, wherein the controller comprises a receiver configured to receive the wirelessly transmitted signal from the transmission detector, wherein the transmitter and the receiver operate in a frequency range of 6 Mhz to 6 Ghz.

Optionally, the transmitter is positioned on an external surface of the transmission detector.

Optionally, the transmission detector further comprises a pre-amplifier coupled with the at least one photomultiplier tube and is adapted to amplify the signal.

Optionally, the X-ray scanner is configured to be handheld.

Optionally, the transmitter further comprises an amplitude modulator adapted to modulate an amplitude of the signal before transmitting the signal. Optionally, the controller comprises a buffer and wherein the receiver comprises an amplitude demodulator for demodulating the amplitude of the transmitted signal before transmitting the signal to the buffer.

Optionally, the transmitter polarizes the signal before transmission for avoiding interference with one or more signals having a same frequency as the signal being transmitted, wherein the polarization is one of: a horizontal polarization or a vertical polarization.

Optionally, the receiver is positioned on an external surface of the transmission detector.

In some embodiments, the present specification discloses an X-ray scanner comprising: a housing; an X-ray source positioned in the housing; a rotating collimator positioned proximate the X-ray source and configured to collimate X-ray beams emanating from the X-ray source; a backscatter detector physically coupled to the housing system; a transmission detector adapted to be positioned remote from the housing and not physically coupled to the housing, wherein the transmission detector is adapted to generate a signal when the X-ray beams emitted by the X-ray source impinge on a surface of the transmitter detector after passing through an object being scanned and wherein the transmission detector further comprises a wireless transmitter for transmitting the signal; and a controller physically coupled to the housing and adapted to control an operation of the X-ray source, wherein the controller comprises a receiver configured to receive the wirelessly transmitted signal from the transmission detector and wherein the controller further comprises a buffer coupled to the receiver and configured to store data indicative of the signal for a predefined period of time, wherein the predefined period of time is a function of at least one of a time when the signal is generated, a position of the rotating collimator, a time when the signal is received, or a time when a signal from the backscatter detector is generated.

Optionally, the transmission detector comprises a plurality of wavelength shifting fibers (WSF) coupled with at least one photomultiplier tube.

Optionally, the X-ray scanner further comprises an analog to digital (A/D) converter coupled to the transmission detector and adapted to convert the signal to a digital signal, wherein an operation of the A/D converter is synchronized using time data from a first clock coupled with the transmission detector.

Optionally, the transmitter coupled with the transmission detector is adapted to transmit the signal and time data from the first clock.

Optionally, the receiver coupled with the controller is adapted to receive the signal and time data from the first clock.

Optionally, the predefined period of time is a function of the time data and the position of the rotating collimator.

Optionally, the controller comprises a digital to analog (D/A) converter coupled with the buffer and adapted to convert the buffered signal to an analog signal after the expiry of the predefined period of time, wherein an operation of the D/A converter is synchronized using time data from a second clock coupled with the buffer, and wherein the time data of the second clock is synchronized using time data of the first clock.

Optionally, the transmitter is positioned on an external surface of the transmission detector.

Optionally, the transmission detector further comprises a pre-amplifier coupled with at least one photomultiplier tube and is adapted to amplify the signal.

Optionally, the X-ray scanner is configured to be handheld.

Optionally, the transmitter further comprises an amplitude modulator adapted to modulate an amplitude of the signal before transmitting the signal.

Optionally, time data the first clock and time data of the second clock are synchronized using at least one of GPS based clock system or a temporary hardwire connection.

Optionally, the predefined period of time is a function of a time taken for one rotation of the collimator.

Optionally, the controller comprises a digital to analog (D/A) converter coupled with the buffer and adapted to convert the buffered signal to an analog signal at a delay equal to a time taken for one rotation of the collimator wheel of the scanner.

Optionally, the transmitter is configured to polarize the signal before wirelessly transmitting the signal to avoid interfering with one or more signals having a same frequency as the signal being transmitted Optionally, the polarization is at least one of a horizontal polarization such that an electrical field of the signal oscillates in a horizontal plane, a vertical polarization such that the electrical field of the signal oscillates in a vertical plane, or an angled plane such that the electrical field of the signal oscillates in a plane that has a non-zero angle relative to the horizontal plane and the vertical plane.

The aforementioned and other embodiments of the present shall be described in greater depth in the drawings and detailed description provided below.

BRIEF DESCRIPTION OF THE DRAWINGS

These and other features and advantages of the present invention will be further appreciated, as they become better understood by reference to the detailed description when considered in connection with the accompanying drawings.

DETAILED DESCRIPTION

Figure 1:
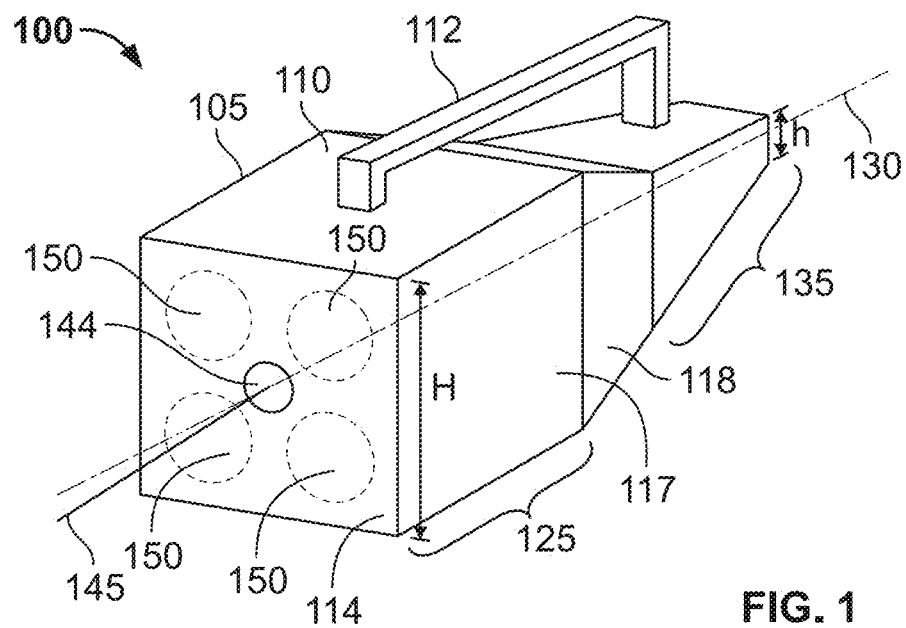
FIG. 1 is a perspective view of a hand-held portable scanning device that may be connected wirelessly with a transmission detector, in accordance with an embodiment of the present specification.

In various embodiments, the present specification provides a transmission detector panel that may be coupled wirelessly to a portable/handheld scanner. While aspects of the present specification may be described herein with reference to particular types of handheld scanners and transmission detectors, the system and method described in detail herein may be used to couple various types of scanners wirelessly with various types of transmission detectors.

In accordance with embodiments of the present specification, the optical coupling of scintillator material to optical waveguides, and, more particularly, to wavelength-shifting fibers, advantageously enables objectives including those peculiar to the demands of X-ray scatter detection.

The term "image" shall refer to any unidimensional or multidimensional representation, whether in tangible or otherwise perceptible form, or otherwise, whereby a value of some characteristic (such as fractional transmitted intensity through a column of an inspected object traversed by an incident beam, in the case of X-ray transmission imaging) is associated with each of a plurality of locations (or, vectors in a Euclidean space, typically R2) corresponding to dimensional coordinates of an object in physical space, though not necessarily mapped one-to-one thereto. An image may comprise an array of numbers in a computer memory or holographic medium. Similarly, "imaging" refers to the rendering of a stated physical characteristic in terms of one or more images.

For purposes of the present description, and in any appended claims, the term "thickness," as applied to a scintillation detector, shall represent the mean extent of the detector in a dimension along, or parallel to, a centroid of the field of view of the detector. The term area, as applied to a detector, or, equivalently, the term "active area" shall refer to the size of the detector measured in a plane transverse to centroid of all propagation vectors of radiation within the field of view of the detector.

Terms of spatial relation, such as "above," "below," "upper," "lower," and the like, may be used herein for ease of description to describe the relationship of one element to another as shown in the figures. It will be understood that such terms of spatial relation are intended to encompass different orientations of the apparatus in use or operation in addition to the orientation described and/or depicted in the figures.

As used herein, and in any appended claims, the term "large-area detector" shall refer to any single detector, or to any detector module, subtending an opening angle of at least 30° in each of two orthogonal transverse directions as viewed from a point on an object undergoing inspection, equivalently, characterized by a spatial angle of at least $\pi$ steradians.

A "conveyance" shall be any device characterized by a platform borne on ground-contacting members such as wheels, tracks, treads, skids, etc., used for transporting equipment from one location to another.

Where an element is described as being "on," "connected to," or "coupled to" another element, it may be directly on, connected or coupled to the other element, or, alternatively, one or more intervening elements may be present, unless otherwise specified.

In various embodiments, a "computing device" includes an input/output controller, at least one communication interface and a system memory and is used to operate the handheld scanner of the present specification. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, may be contained within the system as described in the present specification. In some embodiments, execution of a plurality of sequences of programmatic instructions or code, which are stored in one or more non-volatile memories, enable or cause the CPU of the computing device to perform various functions and processes such as, for example, performing image reconstruction for display on a screen. In alternate embodiments, hard-wired circuitry may be used in place of, or in combination with, software instructions for implementation of the processes of systems and methods described in this application. Thus, the systems and methods described are not limited to any specific combination of hardware and software.

In embodiments, a controller is included in the handheld scanner housing and is used to control the operation of the X-ray source and the routing, transmission, processing, and/or storage of the detection signals. In embodiments, the controller is physically coupled to the housing of the handheld scanner and is adapted to control an operation of the X-ray source. In embodiments, the controller comprises a receiver configured to receive the wirelessly transmitted signal from a transmission detector, wherein the transmitter and the receiver operate in a frequency range of 400-480 MHz. In embodiments, the controller is physically coupled to the housing and adapted to control an operation of the X-ray source, whereby the controller comprises a receiver configured to receive the wirelessly transmitted signal from the transmission detector and whereby the controller further comprises a buffer coupled to the receiver and configured to store data indicative of the signal for a predefined period of time. In embodiments, the predefined period of time is a function of at least one of a time when the signal is generated, a position of the rotating collimator, a time when the signal is received, or a time when a signal from the backscatter detector is generated.

The terminology used herein is for the purpose of describing particular embodiments and is not intended to be limiting. The singular forms "a," "an," and "the," are intended to include the plural forms as well.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

The principles described above are applicable throughout each of the embodiments described in the present specification and will not be repeated with respect to each embodiment.

Handheld Portable X-Ray Scanner with Backscatter Detectors

Figure 2:
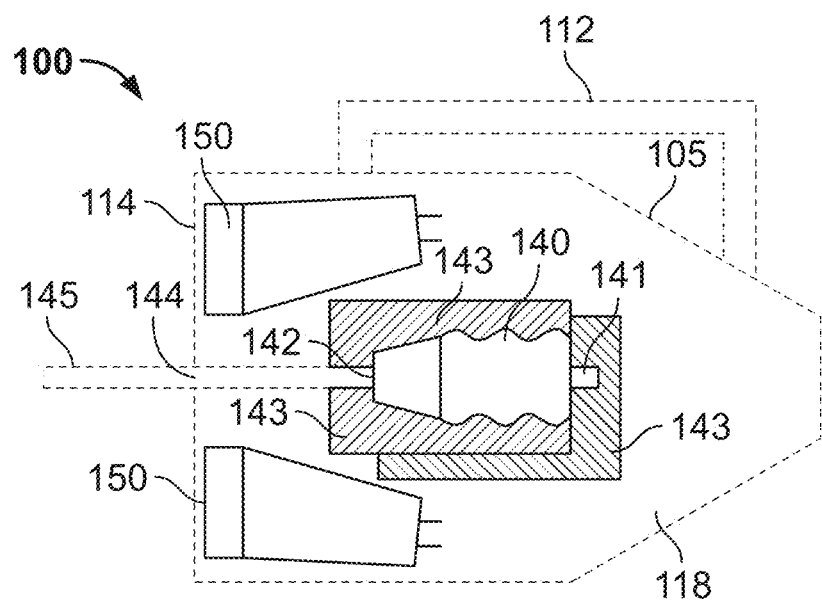
FIG. 2 is a vertical cross-sectional view of the hand-held portable scanning device of FIG. 1.

FIG. 1 is a perspective view of a hand-held portable scanning device that may be wirelessly connected to a transmission detector, in accordance with an embodiment of the present specification. FIG. 2 is a vertical cross-sectional view of the hand-held portable scanning device of FIG. 1. Referring to FIG. 1, an exemplary hand-held portable X-ray based scanning system 100 that may be connected wirelessly to a transmission detector panel, is shown. The hand-held portable X-ray based scanning system 100, also referred to as an imaging system or device, may be used for screening objects such as, but not limited to, baggage, containers/boxes, and other similar items for threat materials, items or people concealed therein. The system 100 is configured in the form of an enclosure or housing 105 having an upper surface 110, a base (not visible in FIG. 1, but opposite, and substantially parallel to, the upper surface 110), a front surface 114, a rear surface (not visible in FIG. 1, but opposite, and parallel to, the front surface 114), a first side 117, and a second side (not visible in FIG. 1, but opposite, and parallel to, the first side 117). The size and weight of system 100 is optimized for enabling an operator to conveniently hold and maneuver the housing 105 while scanning an object under inspection. The housing 105 is in the form of a first cuboid 125 (bearing the front surface 114) that tapers, along a central longitudinal axis 130, into a second cuboid 135 culminating in the rear surface. A height of the first cuboid 125 is greater than a height 'h' of the second cuboid 135. It should, however, be appreciated that the shape of the housing 105 can be cylindrical, conical, pyramidal or any other suitable shape in various embodiments. Specifically, in one embodiment, housing 105 is in the form of a first cuboid 125 that attaches, at a back face and along a central longitudinal axis 130, to a first trapezoidal prism 118 that tapers and, at its back face, attaches the second trapezoidal prism 135.

At least one handle 112 is provided on, for example, the upper surface 110 to allow the operator to hold the housing 105 conveniently in one or both hands and manipulate the device 100 to point the front surface 114 towards and at different regions on the object under inspection. In alternate embodiments one or more handles are provided on one or more areas or regions such as the upper surface 110, the base, the first side 118 and/or the second side so that single-handed or two-handed operation of device 100 is facilitated, depending on what is easiest for the operator.

Referring back to FIGS. 1 and 2, the housing 105 comprises an X-ray tube 140 wherein a corresponding anode 141, also referred to as a target, emits a spatially localized X-ray beam 145 through an opening 142, also referred to as an aperture. At least one shield 143, formed of an X-ray absorptive material, such as tungsten or uranium, surrounds and encloses anode 141 to absorb stray radiation emitted from anode 141. Opening 142, defined through shield 143, is provided with a size and thickness which enables opening 142 to act as a collimator in forming or shaping and limiting the X-ray radiation, emitted from anode 141, into a shaped beam of X-rays 145. In one embodiment, X-ray beam 145 is shaped into a pencil beam.

A cathode and heater filament assembly (enclosed within housing 105) is held at a substantial potential difference (using a chargeable battery also enclosed within the housing 105) with reference to anode 141 by a kilovolt power supply (wrapped around at least one tube shielding 143, in one embodiment). This potential difference causes thermionic electrons freed by the heated cathode (heated using the heater filament) to be directed and drawn to anode 141 at sufficiently high velocity to result in the generation of X-ray beam 145An X-ray beam 145 emerges through an opening 144 at the center of front surface 114 of housing 105, in a direction substantially perpendicular to front surface 114. At least one X-ray backscatter detector 150, is positioned adjacent to and behind front surface 114 in order to maximize detected backscatter signal.

Scatter imaging in which the X-rays are scattered by a material (typically in a generally backward direction) offers several unique inspection capabilities and operational features. Scatter imaging allows images to be obtained even when the imaged object is accessible from only one side. Moreover, since the scatter signal falls off quite rapidly with increasing depth into the object, backscatter images effectively represent a "slice" of the object characteristic of the side nearest to the X-ray source, thereby reducing problems of image clutter that may confound transmission images. The Compton effect, which dominates X-ray scatter in the energy range typically employed in accordance with the present invention, dominates the interaction of X-rays with dense low-atomic-number (low-Z) materials. Narcotic drugs tend to produce the bright signatures in a backscatter image, as do organic explosives, making backscatter imaging a useful imaging modality for bomb or drug detection. Finally, alignment requirements of the x-ray beam with detectors or collimation devices are less exacting than for transmission imaging thereby enabling rapid deployment in a wide range of inspection scenarios.

Flying-spot technology makes possible the acquisition of images using detectors specifically positioned to collect the scattered X-rays. In a typical flying-spot system, a thin "pencil beam" of X-rays is rapidly and repetitively swept through a source-centered, vertically-oriented "fan" of beam paths that are arranged to intercept the object under inspection. At the same time, the object is moved at a constant, slower speed along a path perpendicular to the fan, on a horizontally moving conveyor belt for example. The pencil beam is made to traverse the object in point-by-point raster fashion, and the entire object is scanned as it passes through the fan plane over a period ranging from a few seconds to a few minutes depending upon the length of the object.

Although the total scan time may be seconds to minutes in duration, the actual exposure time of any part of the scanned object is only the brief time it takes for the pencil beam to sweep across a given pixel. That exposure time is typically in the range of microseconds, depending on the design and the application, and yields an entrance exposure to the scanned object that constitutes a low dose to the object also means that there is little radiation available to scatter into the environment, so the doses to operators and other bystanders is correspondingly low.

Figure 3:
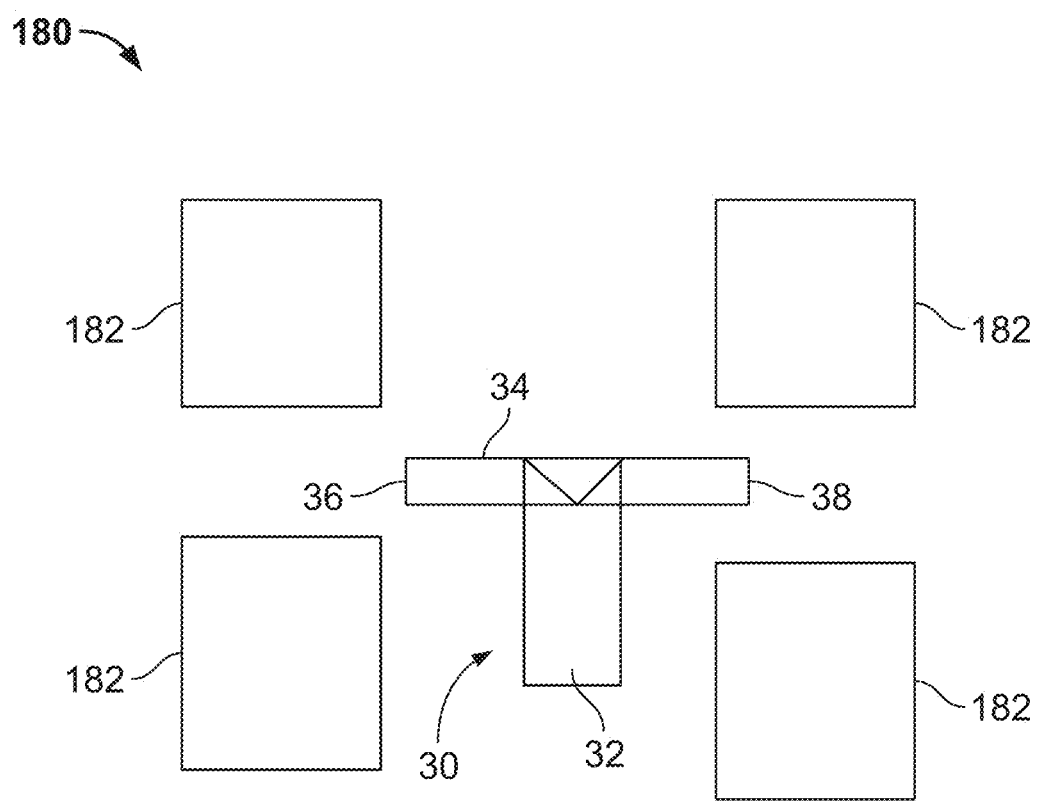
FIG. 3 illustrates a block diagram of a flying-spot X-ray inspection system, in accordance with an embodiment of the present specification.

FIG. 3 illustrates a block diagram of a flying-spot X-ray inspection system, in accordance with an embodiment of the present specification. The components of the flying-spot X-ray inspection system shown in FIG. 3 may be enclosed in a housing of a handheld portable inspection system. System 180 comprises an X-ray source 30 including an X-ray tube 32 and a chopper 34. In an embodiment, source energies are typically below 250 keV thus the chopper 34 may be smaller than employed in systems in which higher-energy X-rays are employed. Chopper 34 may be a rotating perforated hub, or a wheel with transmitting spokes, or any number of means, known in the art, for generation of flying spot beams. In an embodiment, chopper 34 comprises a rotating hoop, with apertures 36 and 38, and emits a pencil beam of X-rays, thereby enabling inspection of objects, possibly on either side of the inspection system.

Various means are known in the art for mechanically or electronically sweeping a beam of penetrating radiation, including, for example, the rotating chopper wheel 34 depicted in FIG. 3 or electronic scanning is described in detail, for example, in U.S. Pat. No. 6,421,420, issued Jul. 16, 2002, which is incorporated herein by reference. In embodiments employing a mechanical rotating chopper wheel 34, as the chopper wheel rotates in a clockwise direction, penetrating radiation emitted from the target of X-ray tube 32 passes successively through a plurality (typically, three or four) of channels. Wheel 34 is fabricated from a material, typically lead, that blocks transmission of X-rays except through apertures 36. X-rays emerge from the currently illuminated channel as a pencil beam that is swept across an object undergoing inspection as the wheel 34 rotates. The dimensions of the X-ray beam typically govern the resolution of a system such as the one depicted. Aperture 36 may have various shapes, and may be circular or rectangular, and may be more specifically tailored. Other X-ray generation approaches may be used to produce a similar sweeping pencil beam, such as spinning discs with elongated slits, wheels with hollow spokes, are alternate embodiments.

Detector modules 182 are typically enclosed within a housing of a handheld portable inspection system. In an embodiment, the detectors 182 may also be carried outside the housing for particular applications within the scope of the present invention. Detector modules contain detectors for detecting penetrating radiation from source 30 that has interacted with, and scattered from, contents of the inspected object.

In embodiments, detector modules 182 comprise transmission detectors placed behind an object being irradiated with the X-ray beam (such that the object is between the X-ray source and the detector), for receiving a transmission beam comprising X-rays that are transmitted through the object. In an embodiment, the received beam is absorbed by a scintillator layer of the detector and subsequently transmitted to a photomultiplier tube for detection, which in turn transmits the detected data to a data acquisition system for processing.

In embodiments, separate, large-area detectors are deployed adjacent to the beam plane on the X-ray source side of the scanned object, and with their active surfaces oriented toward the scanned object. These detectors need only provide a large solid angle for collection of scattered radiation; no critical alignments are required. In this location these detectors respond to x-rays which are scattered generally back toward the source from the object.

In an embodiment, particularly useful for lower energy (140 keV 160 keV) X-ray systems, the output from backscatter detectors 182 are switched to a pulse counting circuit during a fraction of the operating cycle in which the source of X-ray irradiation is switched off. During this period, individual neutrons or gamma rays can be detected and analyzed. The efficiency of the backscatter detectors of an X-ray inspection system for detecting neutrons or gamma ray has been discussed above.

Detectors 182 may also be sensitive to both natural emission and emissions generated by threat materials. In accordance with various embodiments of the present invention, a detector is having high efficiency for detecting thermal and epi-thermal (intermediate energy, typically 1 10.sup.4 eV) neutrons is employed. The detector uses the scintillator $Gd_2O_2S$, commonly known, and referred to herein, as "gadox," to stop both neutrons and the photons. X-ray-induced scintillations from the gadox in the visible portion of the spectrum are then detected, typically by photomultipliers or photodiodes. Alternative scintillators, such as LiF, for example, with high cross sections for detecting thermal and epithermal neutrons are also within the scope of the present invention.

It should be noted that the maximum energy of the X-rays produced by X-ray tube 32 determines the ability of these X-rays to penetrate into the object under inspection i.e., the higher the maximum X-ray energy, the more penetration can be achieved. Similarly, the higher the energy of the scattered X-ray photon, the more likely it is to escape through the object under inspection back to an X-ray detector 182. Therefore, in accordance with an aspect it is desirable to have high X-ray energy to maximize depth of inspection within the object.

Figure 4:
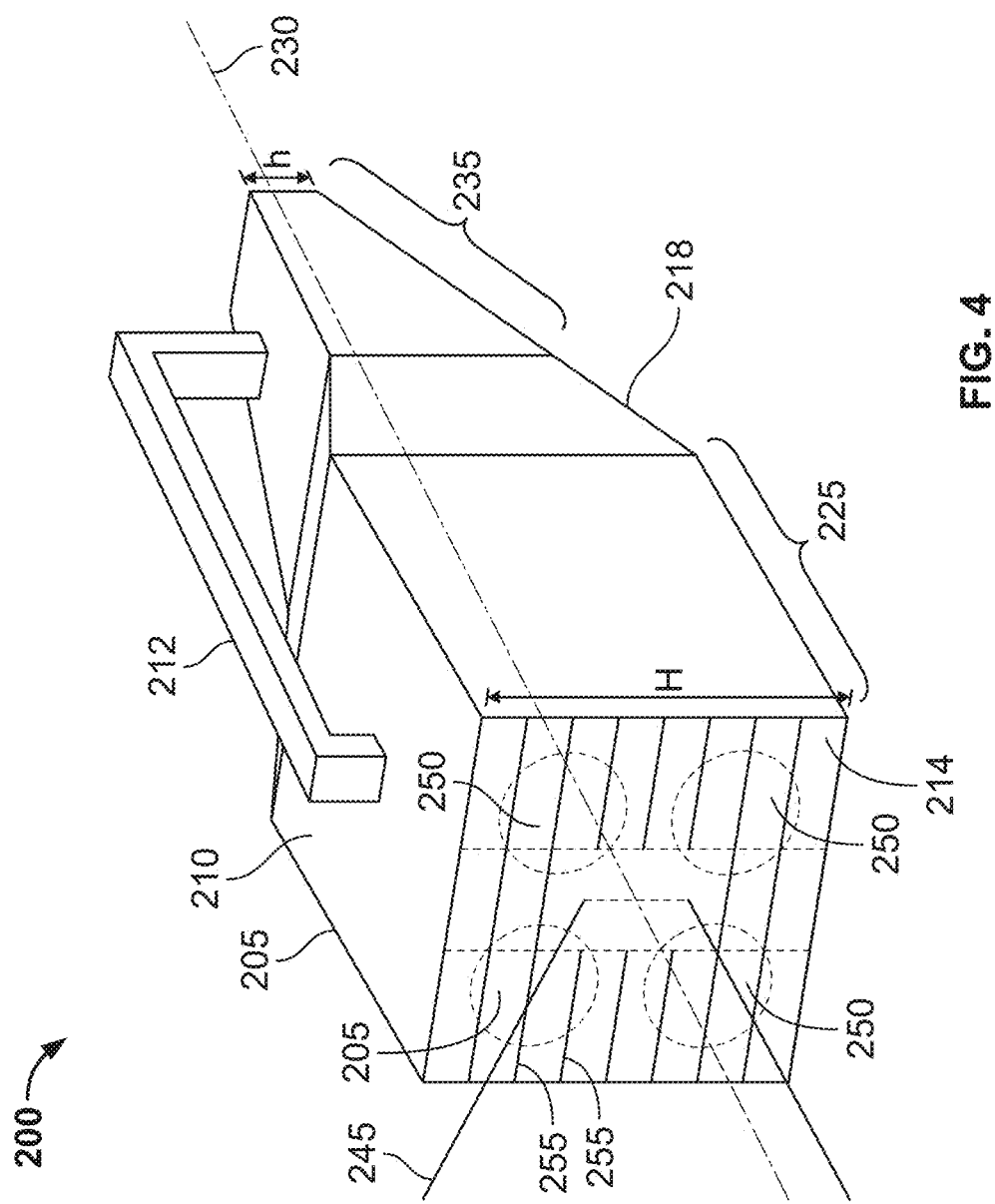
FIG. 4 is a perspective view of a hand-held portable scanning device that may be connected wirelessly with a transmission detector, in accordance with an embodiment of the present specification.

FIG. 4 illustrates another exemplary hand-held portable X-ray based scanning system 200 that may be connected wirelessly to a transmission detector panel, in accordance with an embodiment of the present specification. The handheld portable X-ray based scanning system 200, also referred to as an imaging system or device, may be used for screening objects such as, but not limited to, baggage, containers/boxes, and other items for threat materials, items or people concealed therein. Components of system 200, such as, a housing 205, an upper surface 210, a base, a handle 212, a front surface 214, a rear surface, a first side 218, a second side, a first cuboid 225, a central longitudinal axis 230, and a second cuboid (or trapezoidal prism) 235—are configured similar to corresponding components described above in context of FIGS. 1-3. These components, and the associated variations, are not described herein as they have been described in detail above. The scanning system 200 comprises single pixel backscatter detectors 250. Penetrating radiation scattered by an object being imaged is detected by backscatter detectors 250, wherein each single pixel detector may be coupled to a processor for forming a backscatter image of the object. Detectors 250 may employ wavelength-shifting fiber coupling of scintillation, thereby allowing thin-profile detectors to be deployed outward from a folded configuration with respect to the housing 205.

In an embodiment, a plurality of collimator vanes, blades, fins or plates 255 are optionally positioned in front of detectors 250 and behind front surface 214. Housing 205 comprises an X-ray tube whose anode, also referred to as a target, emits a spatially localized X-ray beam 245

Detector Panels

In various embodiments, and as described above, a portable/handheld scanner such as that shown in FIGS. 1, 2, 3, 4 and 8E comprises an internal backscatter detector (not visible in the figure). In embodiments of the present specification, transmission detector panels are used in conjunction with portable hand held scanners to obtain images of objects being scanned. The detector panel is designed for placement at any position relative to a portable/handheld scanner. In an embodiment, when the detector panel is placed in the path of a beam of radiation generated by an X-ray source, the detector panel acts as a transmission detector.

Figure 5:
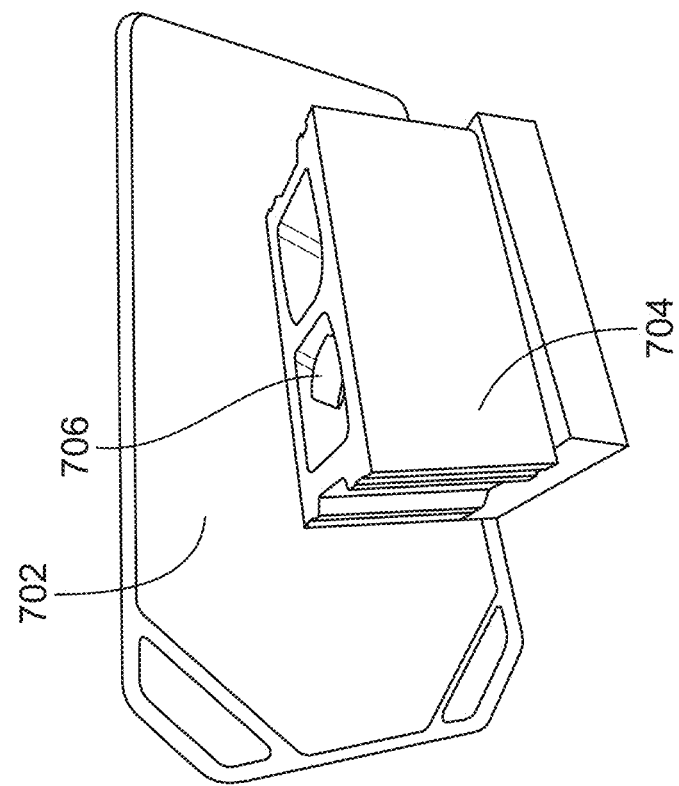
FIG. 5 illustrates a detector panel placed in the path of a direct beam of scanning radiation emitted by a small portable scanner being used to scan an object, in accordance with an embodiment of the present specification.

FIG. 5 illustrates a detector panel placed in the path of a beam of scanning radiation emitted by a small portable scanner being used to scan an object, in accordance with an embodiment of the present specification. As shown, detector panel 702 is placed behind a concrete block 704 which is being scanned by a portable scanner comprising an X-ray source (not shown in the figure) such that the detector panel 702 is placed in a direct beam path of the radiation being emitted by said source. The concrete block 704 houses a steel pipe bomb 706 (partially visible in FIG. 5) and a hand grenade (not visible in FIG. 5).

Figure 6:
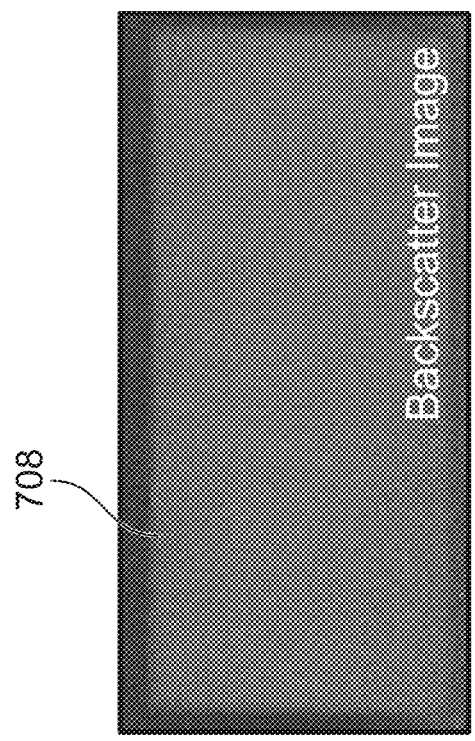
FIG. 6 illustrates a backscatter image obtained by using the scanner of FIG. 5, in accordance with an embodiment of the present specification.
Figure 7A:
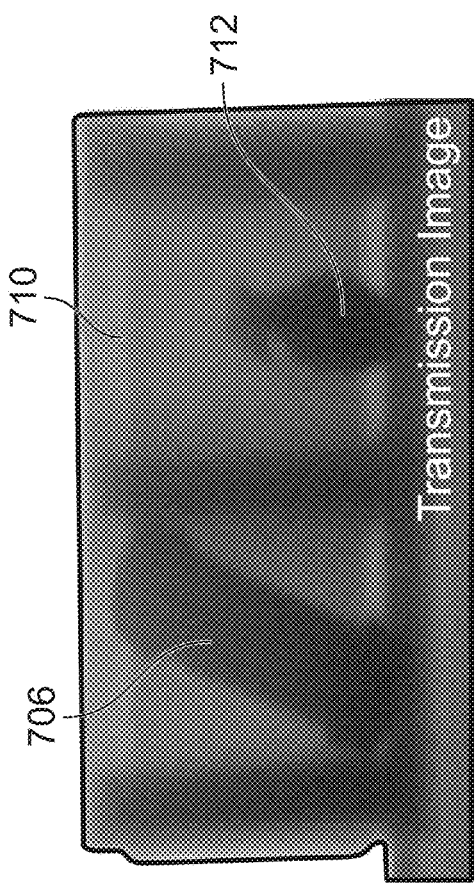
FIG. 7A illustrates a transmission image obtained by a built-in detector of a hand-held scanner by using the detector panel as shown in FIG. 5, in accordance with an embodiment of the present specification.
Figure 7B:
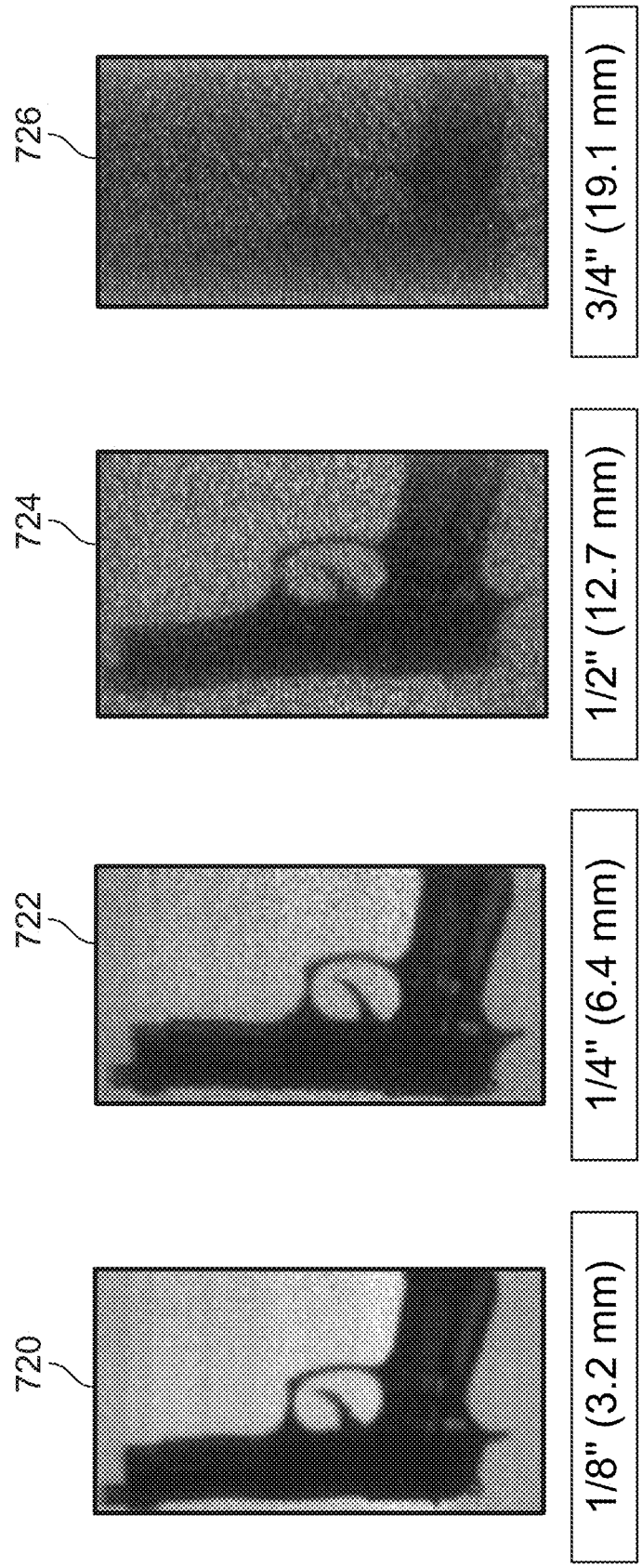
FIG. 7B illustrates transmission images of a gun placed behind steel walls of different thickness obtained by using the detector panel shown in FIG. 5.

FIG. 6 illustrates a backscatter image obtained by using only the detector of FIG. 5, in accordance with an embodiment of the present specification. A backscatter image 708 obtained by using only the built-in detectors of a hand held scanner does not show either the steel pipe bomb 706 or the hand grenade contained within the concrete block 704. FIG. 7A illustrates a transmission image obtained by using a hand-held scanner and the detector panel 702 shown in FIG. 5, in accordance with an embodiment of the present specification. As can be seen in FIG. 7A, the transmission image 710 clearly shows a hand grenade 712 and the steel pipe bomb 706 contained within the concrete block 704. The spatial resolution of the transmission image 710 is governed by the scanning beam spot size, however, the beam penetration and SNR is greatly enhanced as compared to the backscatter image 708. FIG. 7B illustrates transmission images of a gun placed behind steel walls of different thickness obtained by using the detector panel shown in FIG. 5. Images 720, 722, 724, 726 illustrate the images of a gun placed behind 3.2 mm, 6.4 mm, 12.7 mm, and 19.1 mm of steel respectively.

With the use of detector panels along with portable/hand held scanners, a challenge is that there is typically no pre-established physical configuration between the detector and the scanning source. If the position of the source relative to the detector is known/fixed, the location of impurities and irregularities in the detector may be fixed, and hence, any detected data could be automatically corrected for said irregularities. Specifically, the gain could be corrected (increased/decreased) to account for spots or lines due to issues in manufacturing of the scanner/detector. However, with the use of the detector panel as described in the present specification, the relative configuration of the detector panel and the scanning source is changeable, making it difficult to predict precisely the location of non-uniformities in the scanning image. Hence, the non-uniformities that are inherent to the detector response cannot be corrected using known gain correction methods. Without gain calibration, the signals received by using the detector as shown in FIG. 5 will be raw and may include defects such as, but not limited to: gain non-uniformity due to variations in the X-ray absorption in scintillator; non-uniformity in the scintillator light production and propagation; and non-uniformity in light collection across the area of detector.

The challenge, therefore, is to create a detector panel which generates the same light output as a photo multiplier tube (PMT). The more uniform the response, the lower the variability. With the use of conventional fixed X-ray source detector configurations, a variability ranging from 30% to 40% may be tolerated. However, for handheld scanner and detector configurations, a variability of 10% or less is required.

In an embodiment an X-ray detector comprising a screen fabricated from a scintillator material, such as phosphor, that is optically coupled, in optical contact or in physical communication with a wavelength-shifting sheet (WSS), which shifts light absorbed from the scintillator screen may be used as a transmission detector panel wirelessly connected to a handheld portable backscatter X-ray imaging system. The wavelength shifting sheet is coupled to a wavelength shifting fiber or sheet at the edge of the wavelength shifting sheet that is configured to collect a plurality of first shifted rays. The rays collected from the edge are transmitted through to a photodetector, such as a photo multiplier tube (PMT).

The use of a Wave Shifting Sheet (WSS) as the primary material for flying spot transmission X-ray detection reduces or eliminates objectionable, highly visible defects which are inherent in X-ray detectors implemented with solely Wave Shifting Fibers (WSF). In addition, the WSS detector can be fabricated using low cost plastic materials assembled in a simple manufacturing process.

Since, backscatter systems have imaging limitations in certain applications where transmission imaging is advantageous, the WSS detector is implemented as a transmission scan panel that can be used with any commercially available handheld scanning system such as, but not limited to, the MINI Z™ scanning system, and/or embodiments disclosed in U.S. Pat. No. 10,168,445, which is incorporated herein by reference, to provide a simultaneous secondary image. As described above, the detector provides a transmission image when placed directly behind an item being scanned, or an additional backscatter image when placed on the near side of the object being scanned. The secondary image is displayed next to the standard Backscatter image on a display screen coupled with the MINI Z scanning system. In various embodiments, the transmission scan panel is portable, lightweight, and connects to handheld scanning system with a simple, single cable connection.

Figure 7C:
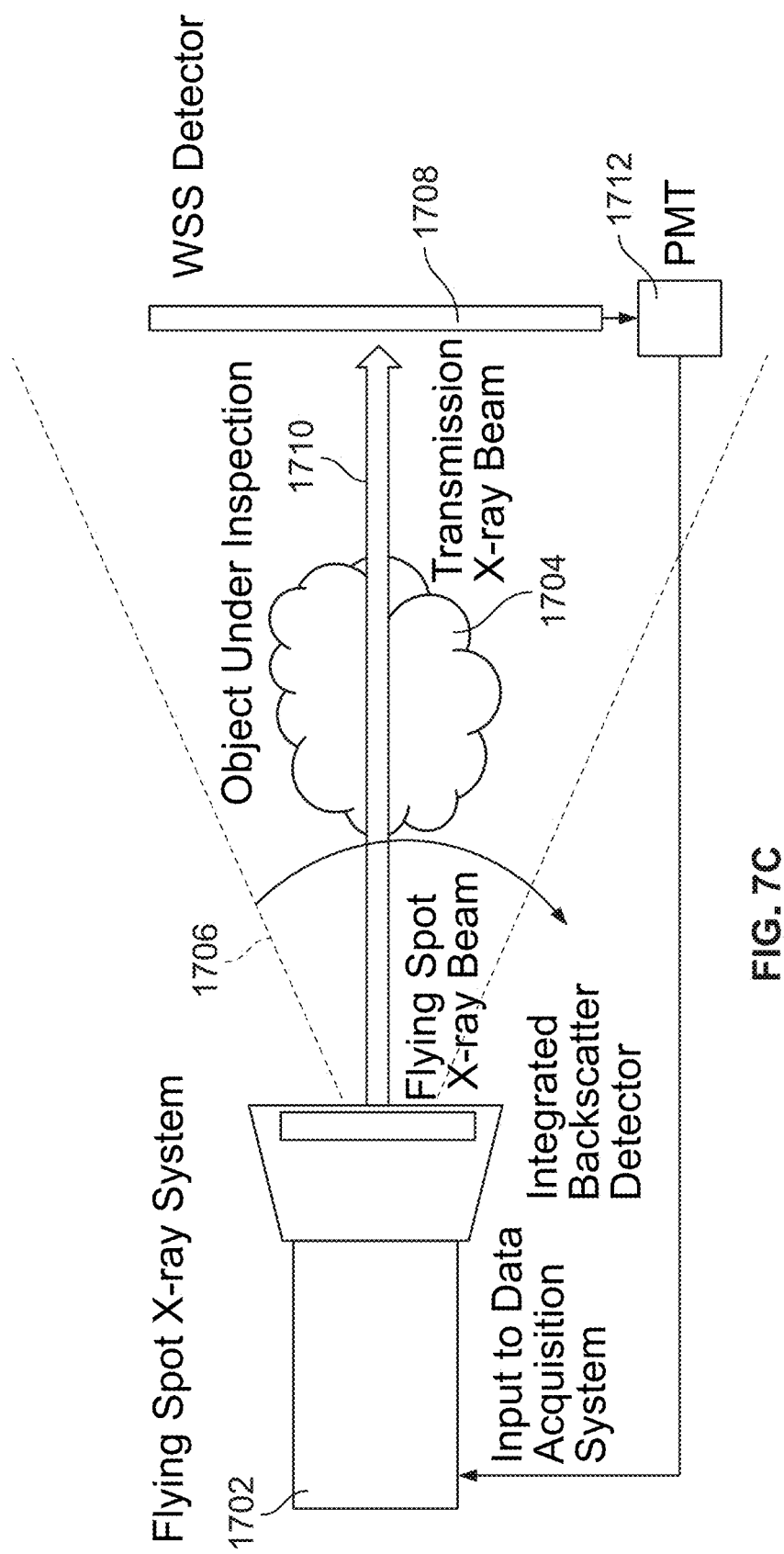
FIG. 7C is a diagrammatic representation of a wavelength shifting sheet (WSS) detector as used in a transmission mode with a flying spot X-ray imager, in an embodiment of the present specification.

FIG. 7C is a diagrammatic representation of a WSS detector as used in a transmission mode with a flying spot X-ray imager, in an embodiment of the present specification. A flying spot X-ray imager 1702 irradiates an object 1704 being inspected with a flying spot beam 1706, as shown in the FIG. 7C. A WSS detector 1708 placed behind the object 1704 (such that the object 1704 is between the imager 1702 and the detector 1708), receives a transmission beam 1710 comprising X rays that are transmitted through the object 1704. The beam 1710 is absorbed by a scintillator layer (not shown in the FIG.) and shifted by one or more WS materials of the WSS detector 1708 as explained in the preceding sections. The shifted beam is transmitted to a photomultiplier tube 1712 for detection which in turn transmits the detected data to a data acquisition system (not shown in the FIG.) of the imager 1702 for processing.

Figure 7D:
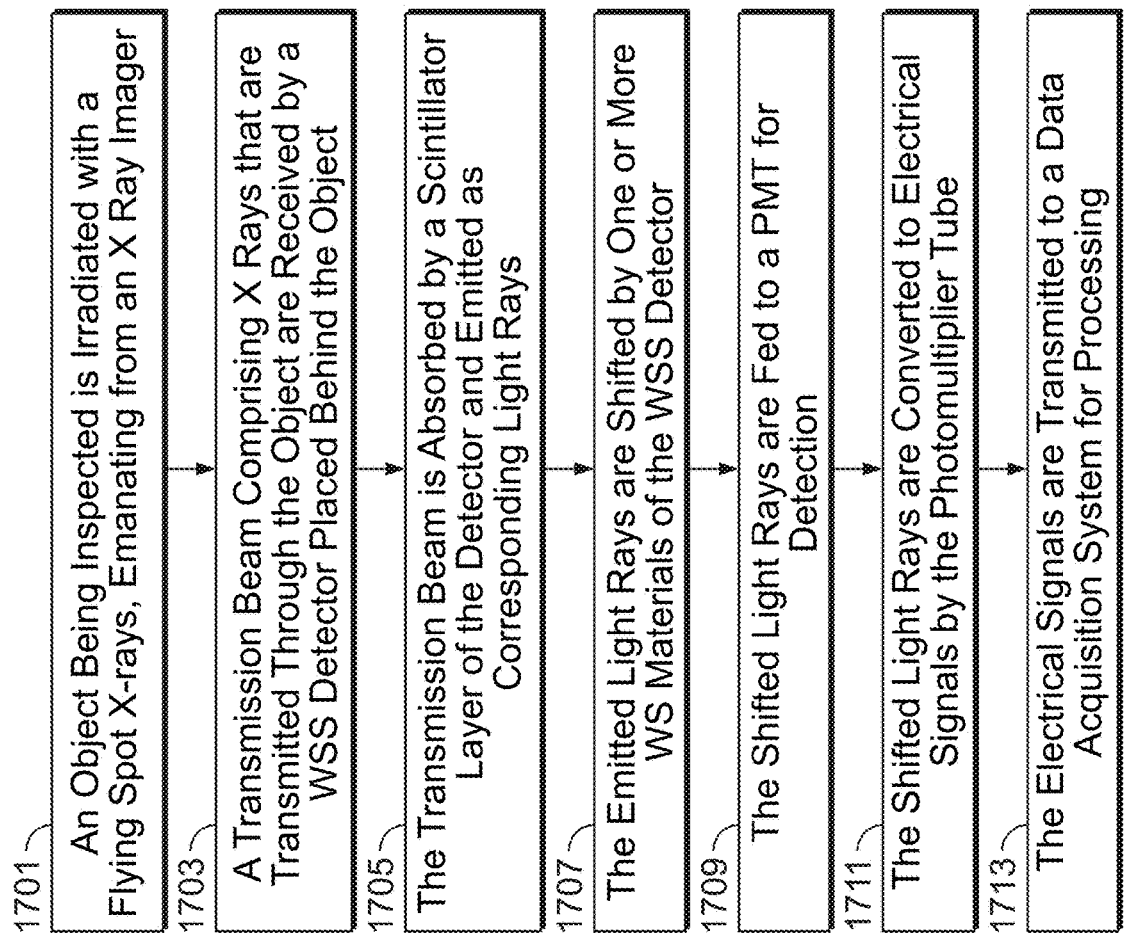
FIG. 7D is a flow diagram representing the steps of using an WSS detector in a transmission mode with a flying spot X-ray imager, in accordance with an embodiment of the present specification.

FIG. 7D is a flow diagram representing the steps of using an WSS detector in a transmission mode with a flying spot X-ray imager, in accordance with an embodiment of the present specification. At step 1701 an object under inspection is irradiated with a flying spot X-rays, emanating from an X-ray imager. At step 1703 a transmission beam comprising X rays that are transmitted through the object are received by a WSS detector placed behind the object (such that the object is positioned between the imager and the detector). At step 1705, the transmission beam is absorbed by a scintillator layer of the detector and emitted as corresponding light rays. At step 1707, the emitted light rays are shifted by one or more WS materials of the WSS detector. At step 1709, the shifted light rays are transmitted to a PMT for detection. At step 1711, the shifted light rays are converted to electrical signals by the photomultiplier tube. At 1713, the electrical signals are transmitted to a data acquisition system for processing.

In embodiments of the present specification, to address any non-uniformity issues, a detector panel comprising wavelength shifting fibers (WSF) is employed. The use of enhanced resolution WSF detectors increases spatial sensitivity of the portable X-ray imaging system through the use of multiplexed WSF coupled to a multi-anode photo multiplier tube (PMT). Typically, the detector comprises multiple layers of WSF in order to determine both the high resolution content of the image by detecting the intensity captured by individual fibers, as well as low resolution mapping in order to determine a coarse location of the focal spot. In this way, a high resolution image is generated with a minimum of data individual channels, thus saving cost and complexity of the system.

Advantages of using the WSF detector panels include increases in the efficiency of detection and the low geometrical profile of implementation. This allows greater freedom in designing a detection system and it makes entirely new, space constrained applications possible. The mechanical flexibility of the detector structure allows shaping the detector surface to conform to the application, such as an implementation in which an imaged object is surrounded by detector volume. The low profile also makes it relatively easy to orient and shield the detector area in ways to minimize the detection of unwanted scatter radiation (crosstalk) from a nearby X-ray imaging system.

Figure 8A:
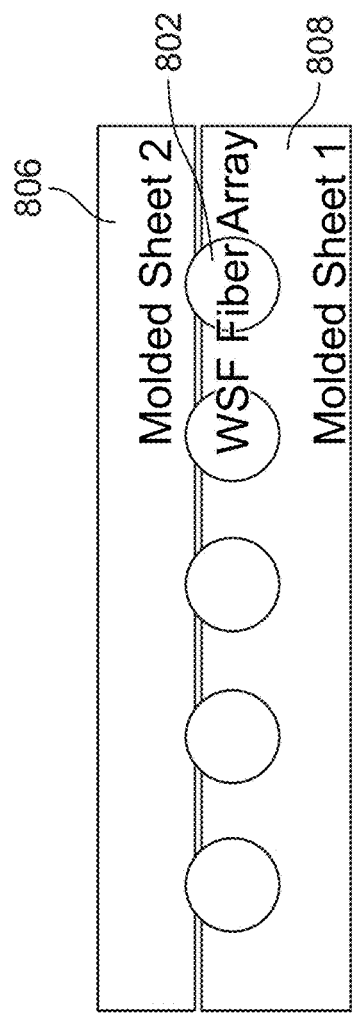
FIG. 8A illustrates a diagrammatical representation of a wavelength shifting fiber (WSF) detector panel, in accordance with another embodiment of the present specification.
Figure 8B:
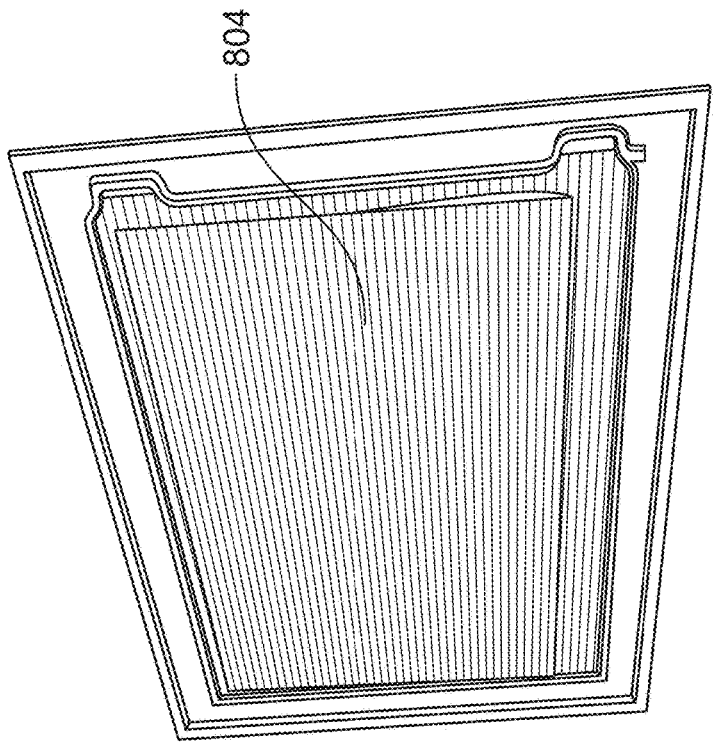
FIG. 8B illustrates the WSF detector panel of FIG. 8A, in accordance with an embodiment of the present specification.

FIG. 8A illustrates a diagrammatical representation of a WSF detector panel, in accordance with another embodiment of the present specification. FIG. 8B illustrates the WSF detector panel of FIG. 8A, in accordance with an embodiment of the present specification. Referring to FIGS. 8A and 8B, a plurality of WSF fibers 802 are held together at a predefined distance forming a detector panel 804 by molded sheets of a transparent, flexible plastic binder 806, 808 with scintillator powder embedded. In some embodiments, the transparent, flexible plastic binder 806, 808 is silicone. In some embodiments, the transparent, flexible plastic binder 806, 808 is polyvinyl butyral (PVB) mixed with a plasticizer. In an embodiment, a spacing of 3 mm is maintained between the fibers 802 by adjusting the scintillator powder concentration. A spacing of 3 mm is used as the variability in light intensity across the detector panel disappears at sizes greater than 4 mm. As the powder concentration in the detector panel decreases, the light is able to travel further, providing a more uniform response. In an embodiment, the ends of fibers 802 are bundled into PMTs and may be read out from one or both ends. The detector shown in FIGS. 8A, 8B is easy to manufacture, and minimizes the number of WSF fibers required to obtain a detector of a desired area. The detector also provides a uniform coupling of light in associated PMT leading to a signal detection.

Wireless Transmission Detector Panels

In various embodiments, by using a transmission detector panel such as is shown in FIG. 5, along with a backscatter detector built within a portable/hand held scanner, a transmission image as well as a backscatter image of an object being scanned may be obtained simultaneously thus providing an operator with additional information regarding the object being scanned and enhancing the scan quality.

In embodiments, a controller is included in the handheld scanner housing and is used to control the operation of the X-ray source and the routing, transmission, processing, and/or storage of the detection signals. In embodiments, the controller is physically coupled to the housing of the handheld scanner and is adapted to control an operation of the X-ray source. In embodiments, the controller comprises a receiver configured to receive the wirelessly transmitted signal from a transmission detector. In embodiments, the wireless transmission panel, and thus, the transmitter and the receiver are configured to operate using a range of radio spectrum reserved internationally for industrial, scientific and medical (ISM) purposes. These frequencies can range from 6 Mhz to 6 Ghz and are allocated in specific bands for non-regulated devices. Specifically, the panel could utilize the 2.4 and 5.7 GHz ISM bands which are commonly used for Bluetooth and wireless modems. While there are regional requirements for some bands, embodiments of the present specification are compatible with the full range. In an embodiment, the transmitter and the receiver operate within a frequency range of 400-480 MHz.

In embodiments, the transmitted signal from the transmission detector may be horizontally or vertically polarized, or polarized to a certain angle relative to a horizontal or vertical plane, before transmission. As is known, the polarization of the transmitted signal is achieved by the polarization of the signal's electric field, wherein for a horizontally polarized transmission signal, the electric field moves sideways in a horizontal plane; and for a vertically polarized transmission signal, the electric field oscillates up and down in a vertical plane. In embodiments, the transmitted signal is either vertically or horizontally polarized, depending upon a desired region of transmission, in order to avoid having the transmitted signal interfere with other signals in the region having frequencies which are the same as the transmitted signal. In embodiments, a controller may be configured to allow an operator of the system, or the system itself based on data indicative of a presence of other signals, to select an angle or degree of polarization, including at least one of a horizontal polarization (where the electrical field oscillates in a horizontal plane), a vertical polarization (where the electrical field oscillates in a vertical plane), an angled polarization (where the electrical field oscillates in a plane that is angled relative to a horizontal or vertical plane). Upon selecting a degree and/or angle of oscillation, the controller may cause the transmitter to generate a field having oscillation characteristics in accordance with the selected degree and/or angle of oscillation, as described above.

In embodiments, the controller is physically coupled to the housing and adapted to control an operation of the X-ray source, whereby the controller comprises a receiver configured to receive the wirelessly transmitted signal from the transmission detector and whereby the controller further comprises a buffer coupled to the receiver and configured to store data indicative of the signal for a predefined period of time. In embodiments, the predefined period of time is a function of at least one of a time when the signal is generated, a position of the rotating collimator, a time when the signal is received, or a time when a signal from the backscatter detector is generated.

Figure 8D:
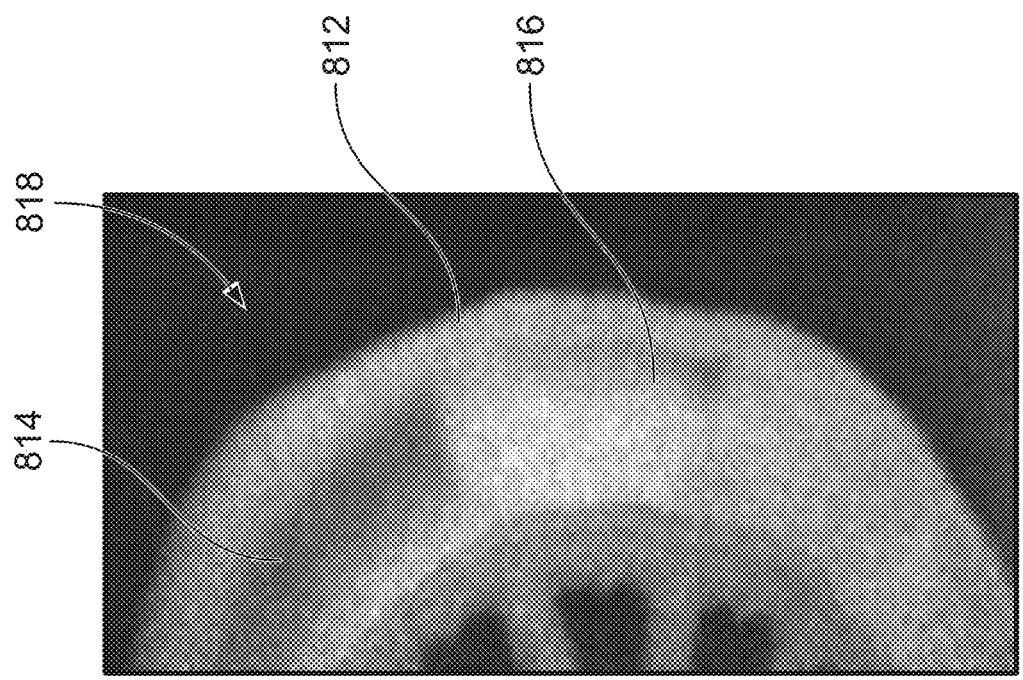
FIG. 8D illustrates a scan image of the car wheel by using a backscatter detector.
Figure 8C:
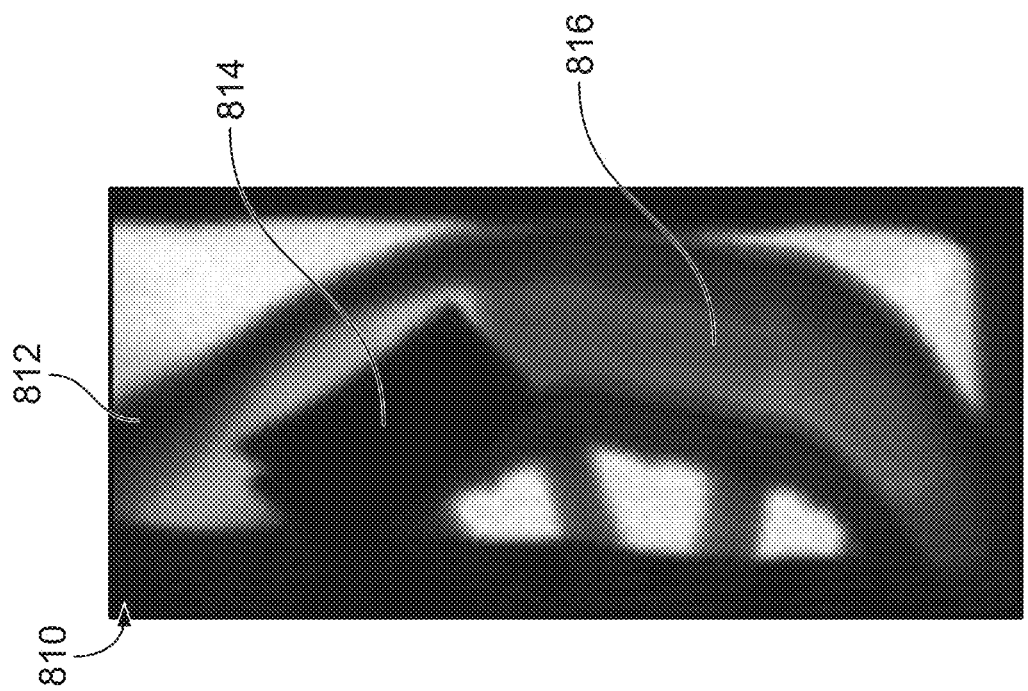
FIG. 8C illustrates a scan image of a car wheel obtained by using a transmission detector.
Figure 8E:
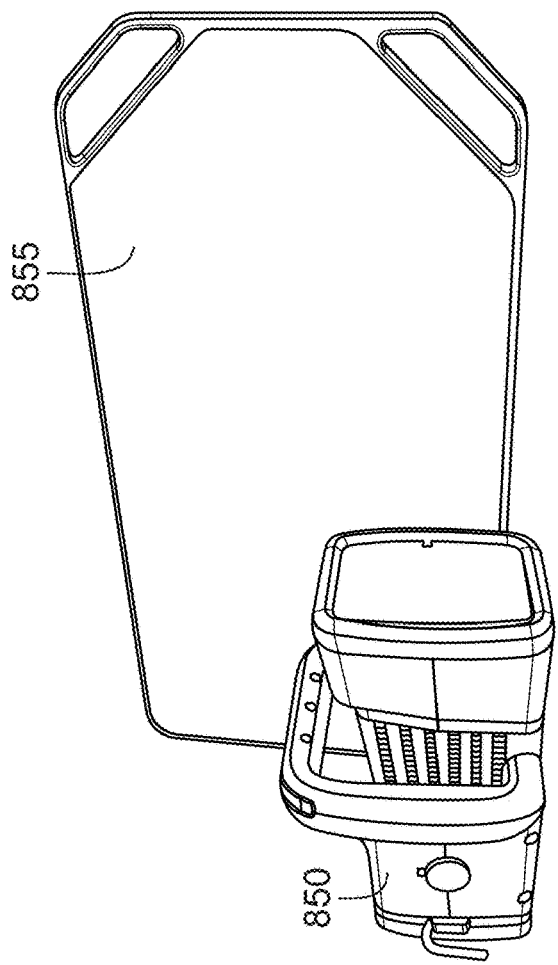
FIG. 8E illustrates a portable/hand held scanner and a transmission detector panel that may be used to obtain the images of FIGS. 8C and 8D.

FIG. 8C illustrates a scan image of a car wheel obtained by using a transmission detector. FIG. 8D illustrates a scan image of the car wheel by using a backscatter detector. The transmission image 810 of a car wheel 812 shown in FIG. 8C reveals a lead box 814 concealed in the wheel 812. The box 814 may contain narcotics or other prohibited items. The transmission image 810 does not clearly show clearly narcotics 816 hidden within wheel 812, which are more clearly visible in a backscatter image 818 of the wheel 812. By obtaining the transmission image 810 and backscatter images 818 simultaneously, an operator can obtain a clear picture of the items hidden in the wheel 812. Hence a combined analysis of simultaneously obtained transmission and backscatter scan images of an object enhances the scan quality and enables an operator to detect any threat items hidden within the object. FIG. 8E illustrates a portable/handheld scanner 850 and a transmission detector panel 855 that may be used to obtain the images of FIGS. 8C and 8D.

In various embodiments, and as described above, a portable/handheld scanner such as that shown in FIG. 8E comprises an internal backscatter detector (not visible in the figure). Usually, the transmission detector panel 855 is coupled with the portable/handheld scanner 850 by using power and signal cables in order to synchronize the backscatter detector of the scanner 850 and the transmission detector 855. Since, the distance between the portable/ handheld scanner 850 and the detector panel 855 may be up to 50 feet, cables extending through this distance maybe cumbersome and cause disruption in the scanning process. Hence, in an embodiment, the present specification provides a transmission detector panel that may be coupled wirelessly to a portable/handheld scanner. In various embodiments, the wireless transmission detector panel of the present specification may communicate with a portable/handheld scanner over a distance ranging from a few inches to 200 feet even when line of sight is not available between the detector panel and the scanner.

Figure 9:
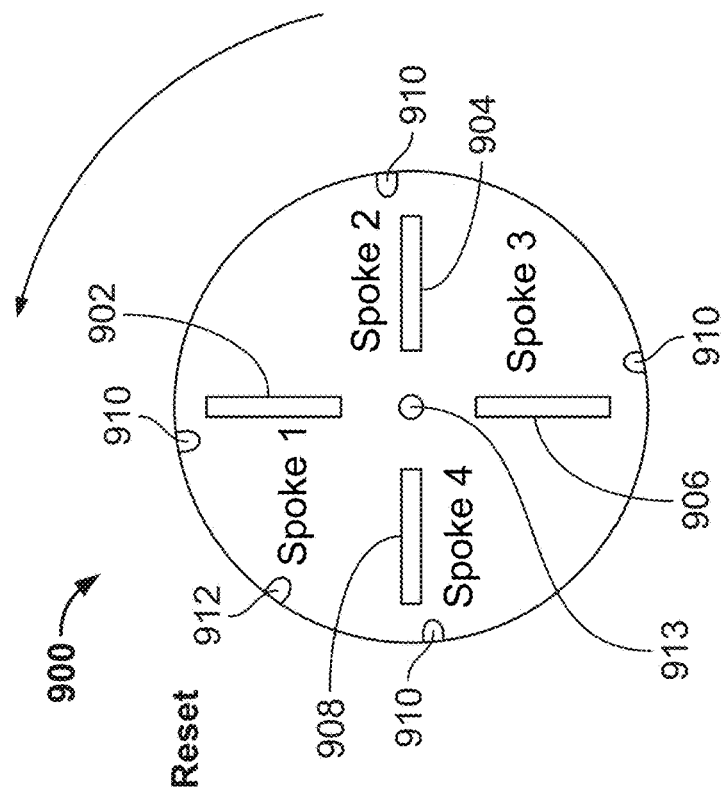
FIG. 9 illustrates a collimator wheel of a portable/handheld scanner, in accordance with an embodiment of the present specification.

The portable/handheld scanner 850 comprises an X-ray source and a collimator wheel comprising at least four spokes for producing a well-collimated pencil-beam of X rays which is raster scanned across an object being inspected, and the X rays backscattered from the object toward the source are collected by backscattered detectors integrated within the portable/handheld scanner. FIG. 9 illustrates a collimator wheel of a portable/handheld scanner, in accordance with an embodiment of the present specification. Collimator wheel 900 comprises four spokes 902, 904, 906, and 908, and as the wheel 900 rotates, each spoke passes before an X-ray source of the portable/handheld scanner to generate one raster scan line corresponding to an object being inspected. Grooves, protrusions, extensions, or members, all collectively referred to as notches, 910 mark the commencement of a new raster scan line. A notch 912 is shown before the first spoke 902 and signals the start/reset of the raster scan lines. In embodiments the notches are provided with optical indicators so that a light shining through the wheel indicates a spoke passing before the X-ray source. A notch 913 may be provided at the center of the wheel 900 for functioning as a wheel rotation indicator. In an embodiment, the timing and spoke timing configuration of a collimator wheel of a portable/handheld scanner are such that a) each raster scan line comprises 900 pixels per line, b) there are 4 acquisitions per displayed pixel, c) there are approximately 5 micro seconds per acquisition, d) there are approximately 20 micro seconds per pixel, e) there are 2640 rotations per min, and e) there are 22.7 milliseconds per wheel revolution, or 176 lines per second are acquired. In some embodiments, the number of acquisitions per displayed pixel is more or less than 4, however the 4 pixel average is used to obtain a desired compromise between resolution and SNR of the scanner.

In various embodiments, wireless communication electronics are provided within a housing of, or on an external surface of the portable/handheld scanner, as well as in data communication with the transmission detector panel. In an embodiment, wireless communication is implemented between a portable/handheld scanner and a transmission detector by using an analog method of synchronizing the integrated backscatter detector of the portable/handheld scanner and the transmission detector panel. In an embodiment, an amount of delay between generation of an X-ray beam and the detection of the beam by a detector is known and may be fixed and calibrated. This known fixed delay may be used to synchronize the backscatter detector and the transmission detector detection timings.

More specifically, in an embodiment, the scanner is provided with an internal data converter that is used to convert detector signals at predefined time intervals, for example, every 5 microseconds and collect the signals over said time interval. When the scanner is connected to a transmission detector panel a similar data conversion and transmission occurs. With fixed, predefined data conversion intervals (e.g. every 5 microseconds), known, fixed delays may be defined and used to synchronize the backscatter and transmission detection signal timings. In an embodiment, each pixel is equivalent to approximately 20 microseconds of data acquisitions.

Figure 10:
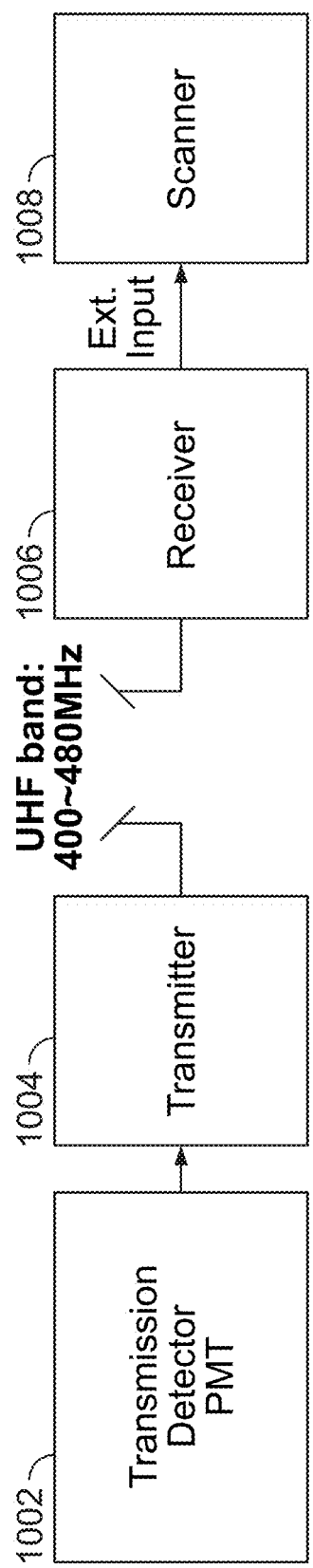
FIG. 10 illustrates a block diagram of circuitry employed to implement analog wireless communication between a transmission detector panel and a portable/handheld scanner, in accordance with an embodiment of the present specification.

In an embodiment, analog detection signals generated by a photomultiplier tube (PMT) of the transmission detector panel are communicated (without conversion to digital form) to the portable/handheld scanner. FIG. 10 illustrates a block diagram of circuitry employed to implement analog wireless communication between a transmission detector panel and a portable/handheld scanner, in accordance with an embodiment of the present specification. As shown in the FIG. 10, a PMT and pre-amplifier 1002 of a transmission detector panel such as shown in FIG. 7A, 7B, is coupled with an amplitude modulator transmitter 1004 which communicates wirelessly with an amplitude de-modulator receiver 1006 provided within, or on a surface of, a portable/handheld scanner 1008 (such as shown in FIG. 8C). Analog signals communicated by the PMT 1002 are demodulated by the receiver 1004 and are input to the scanner 1008 without conversion to digital form. In an embodiment, the transmitter, receiver 1002, 1004 comprise an ultra-high frequency (UHF) band antennae having a frequency range of 400-480 MHz. In an embodiment, the transmitter, receiver 1002, 1004 also operate in the FM range of frequencies. The embodiment shown in FIG. 10 provides low cost and low power consumption solution for no-delay analog wireless communication between a transmission detector panel and a portable/hand-held scanner over a large distance, as described above.

Figure 11:
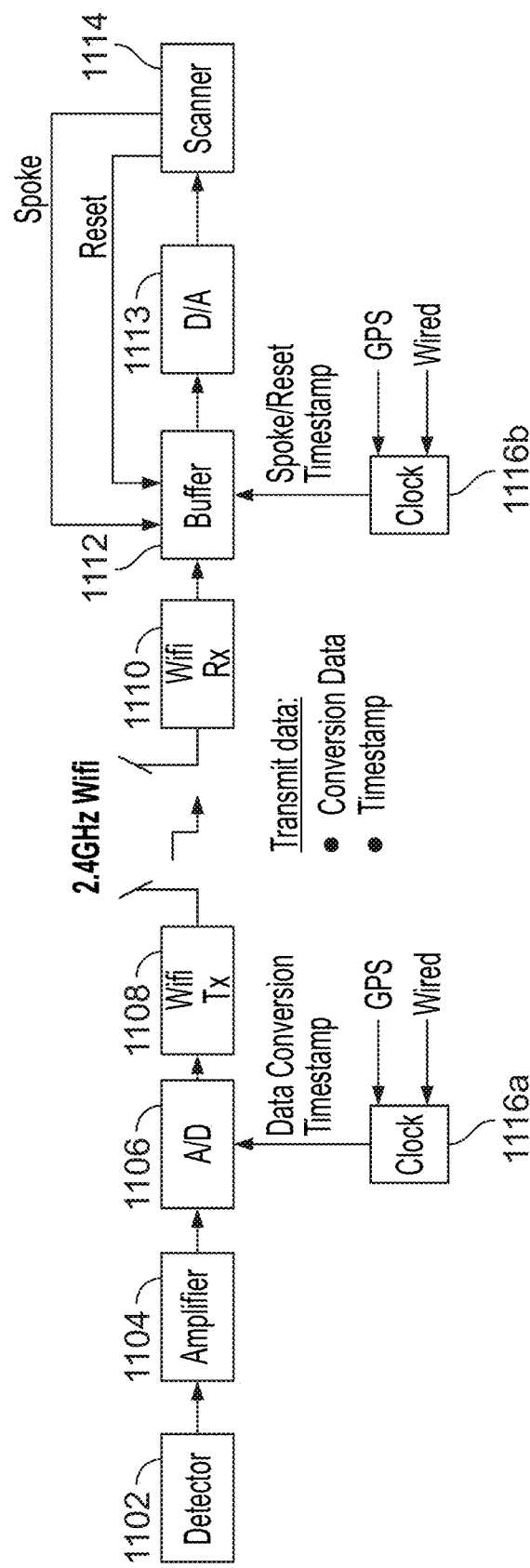
FIG. 11 illustrates a block diagram of circuitry employed to implement digital wireless communication between a transmission detector panel and a portable/handheld scanner, in accordance with an embodiment of the present specification.

In another embodiment, analog detection signals generated by a PMT of the transmission detector panel are converted to digital signals and then communicated (in digital form) to the portable/handheld scanner. FIG. 11 illustrates a block diagram of circuitry employed to implement digital wireless communication between a transmission detector panel and a portable/handheld scanner, in accordance with an embodiment of the present specification. As shown in FIG. 11, a PMT of a transmission detector panel 1102 (such as shown in FIG. 7A, 7B) generates analog detector signals which are amplified by an amplifier 1104 and converted to digital form by an analog to digital (A/D) converter 1106 before being transmitted by a transmitter 1108. The transmitted digital signals are received by a receiver 1110 provided within, or on an external surface of, the scanner, buffered using a buffer circuit 1112 and converted to analog form by a digital to analog (D/A) converter 1113 before being input to the scanner 1114. In an embodiment, the receiver 1110, buffer circuit 1112 and the D/A converter 1113 are provided as compact circuitry on an external surface of the scanner 1114. In various embodiments, data at the transmitter and the receiver ends is synchronized by using a unifying clock source, either wirelessly from a global positioning satellite (GPS) source or hardwire-based clocks 1116a, 1116b.

In an embodiment, conversion and time stamp data are sent over WiFi or Bluetooth connection established between the transmitter 1108 and the receiver 1110. In an embodiment the conversion and time stamp data are sent over a 2.4 GHz WiFi connection. In various embodiments, the transmitter 1108 comprises built in re-transmit capability. As shown in FIG. 11, the buffer circuit 1112 receives time stamps from both the clocks 1116a, 1116b as well as the wirelessly transmitted data from the transmitter 1110, stores the time stamps and the data for a predefined time period and feeds said data to the digital to analog (D/A) converter 1113 at a delay equal to the predefined time period. In an embodiment, data indicative of the state of rotation, a position of rotation, the rate of rotation, and/or a time taken for one rotation of a collimator wheel, as discussed above in relation to FIG. 9, is also fed to the buffer circuit 1112 and used to determine the predefined time period used to define or establish the delay. In an embodiment, the time period is equal to the time taken for one rotation of the collimator wheel of the scanner 1114 and used to establish the delay imposed by the buffer circuit 1112 before feeding the received wireless transmission data to the analog to digital converter 1113. The digital wireless communication circuit illustrated in FIG. 11 is a robust design that can achieve the desired results even in noisy environments.

Figure 12B:
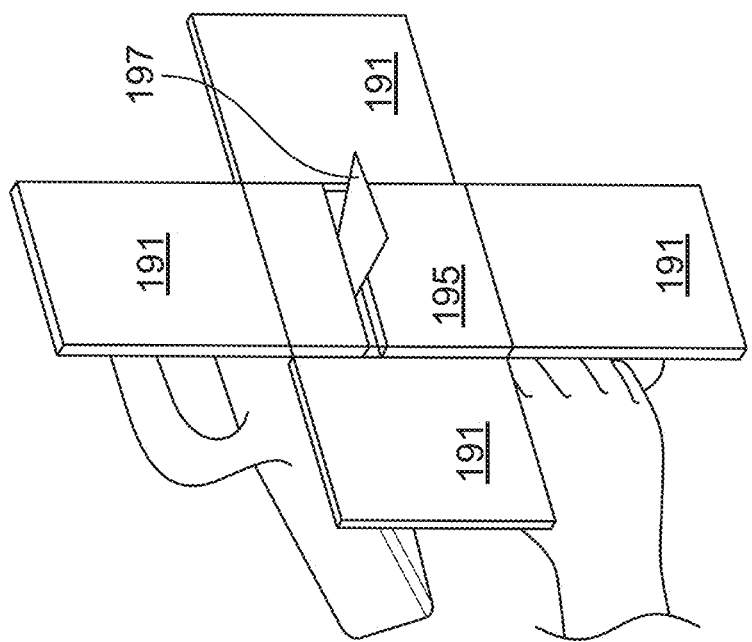
FIG. 12B shows multiple detectors folding out of a hand-held scanner, in a deployed condition, in accordance with an embodiment of the present specification.
Figure 12A:
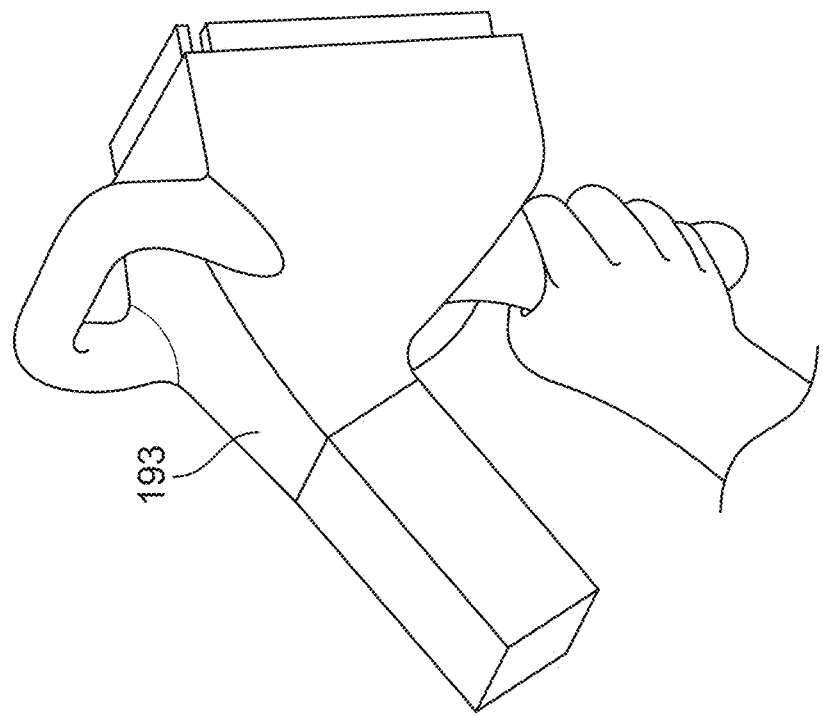
FIG. 12A shows multiple detectors folding out of a hand-held scanner, in a stored condition, in accordance with an embodiment of the present specification.
Figure 12C:
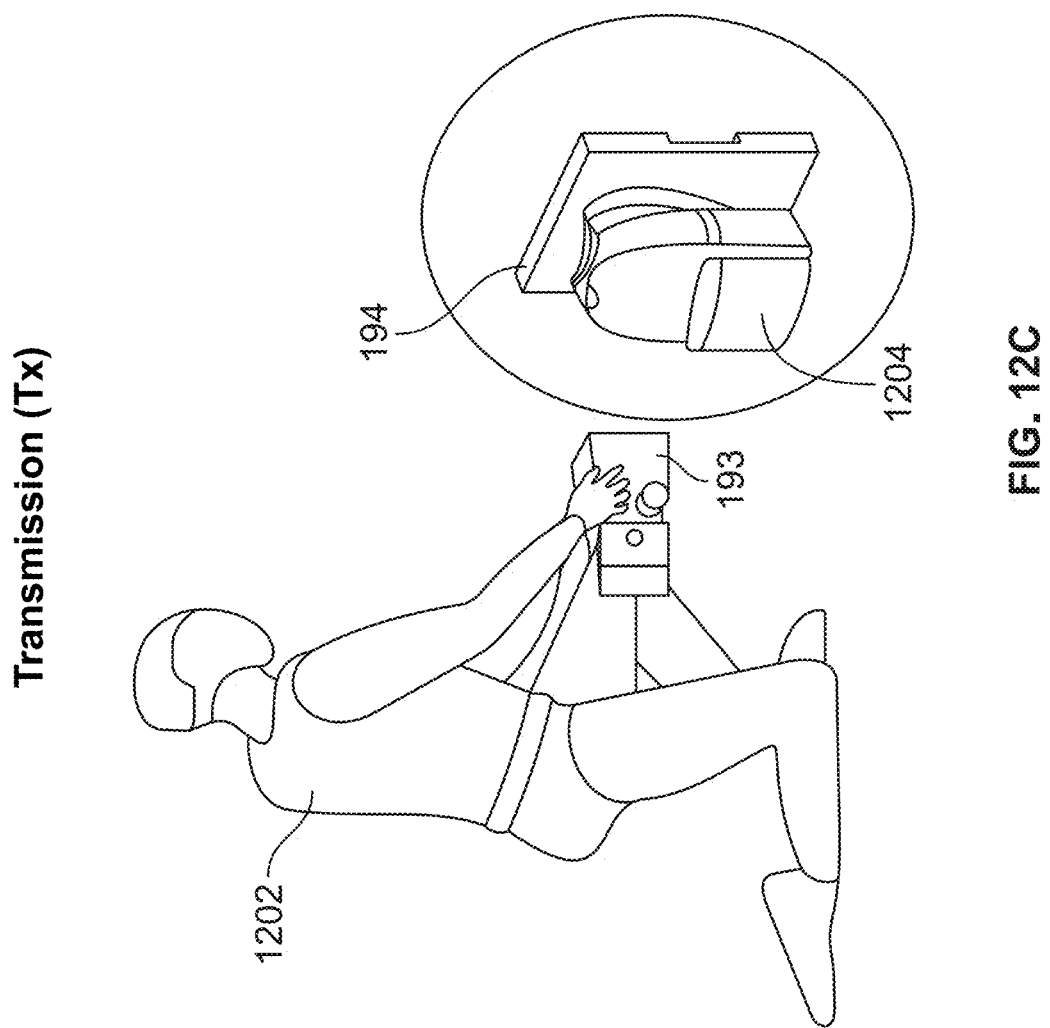
FIG. 12C illustrates the imaging system of FIG. 13A connected with a transmission detector panel, in accordance with an embodiment of the present specification.

Exemplary Use Cases
Transmission Detectors Connected Wirelessly with Mini Backscatter Inspection Systems FIGS. 12A and 12B, illustrate a hand-held imaging system 193 which may be used with a thin wireless detector panel such as described in the present specification. As is known, power requirements, inspection time, and, quality of the image, are all affected by the solid angle of detection. A traditional detector with, for example, a cross-section of 10 cm×10 cm (100 cm$^2$), weighs about a half a kilogram. The imaging system 193 comprises a 10-cm cube of WSF, weighing no more than twice as much, which is made of individual WSF 10 cm×10 cm detectors, each less than 5 mm thick, that can be unfolded to present a backscatter detection area of at least 2,000 cm$^2$, a twenty-fold increase in this example. The additional detection coverage can make an order of magnitude improvement in the hand-held system's performance. FIG. 12A, 12B shows an example in which four detectors 191 fold or slide out of hand-held scanner 193 to substantially increase the detection efficiency, especially for items concealed deeper in the object being inspected. Backscatter detectors 195 straddle irradiating beam 197. FIG. 12C illustrates the imaging system 193 connected with a transmission detector panel 194 placed at a distance from the system 193, wirelessly as explained above, in order to obtain both a backscatter and a transmission image of an object being scanned. Referring to FIGS. 12A, 12B and 12C, in various embodiments, in order to operate the imaging system 193 in conjunction with the transmission detector panel 194, an operator 1202 is required to position the detector 194 with respect to the target being scanned 1204, energize the hand-held imaging system 193, translate the imaging system 193 across the region of the target 1204 and collect the scattered and transmission data for review. Referring to FIG. 12C, backscattered photons are detected by the built-in backscatter detector of the hand-held imaging system 193. As explained above, by using the transmission detector panel 194, along with a backscatter detector built within a portable/hand held scanner 193, a transmission image as well as a backscatter image of an object 1204 being scanned may be obtained simultaneously, thus providing an operator with additional information regarding the object being scanned and enhancing the scan quality.

Backscatter Inspection of the Underside of Stationary Vehicles

The inspection of the underside of vehicles by a portable X-ray backscattering system presents special problems. The road clearance of cars is not more than 8" and can be as little as 6". Fixed inspection systems, such as portals, can place a detector in the ground or above. Mobile under-vehicle inspection systems, however, which are needed for security in many areas, have never been developed. Inspectors rely on passive inspection tools such as mirrors and cameras, which miss contraband in the gas tank or are camouflaged to appear innocuous.

Figure 13A:
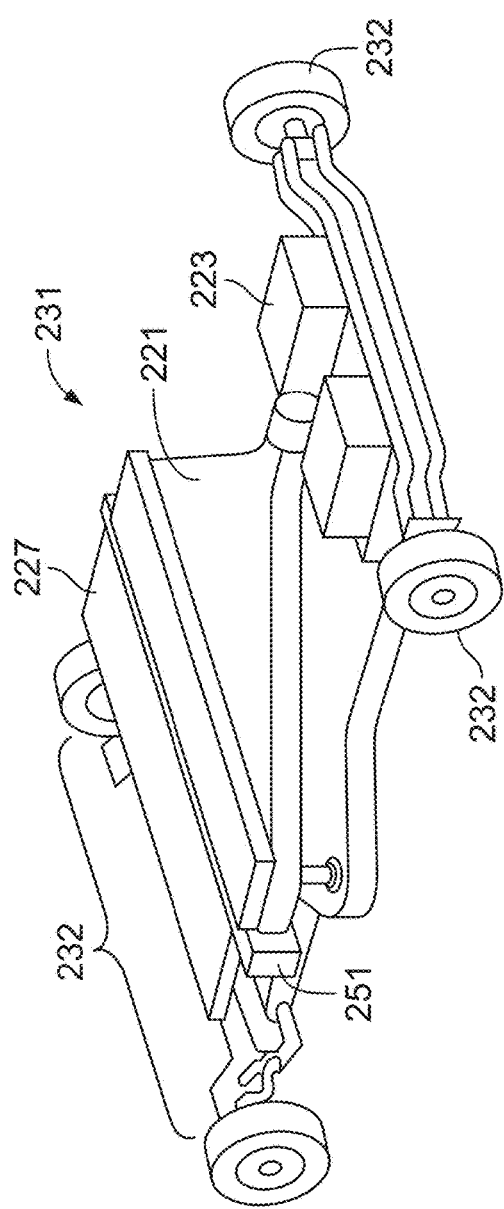
FIG. 13A shows a backscatter unit that, by virtue of WSF detectors in accordance with the present specification, may be slid under a vehicle for under-chassis inspection.
Figure 13B:
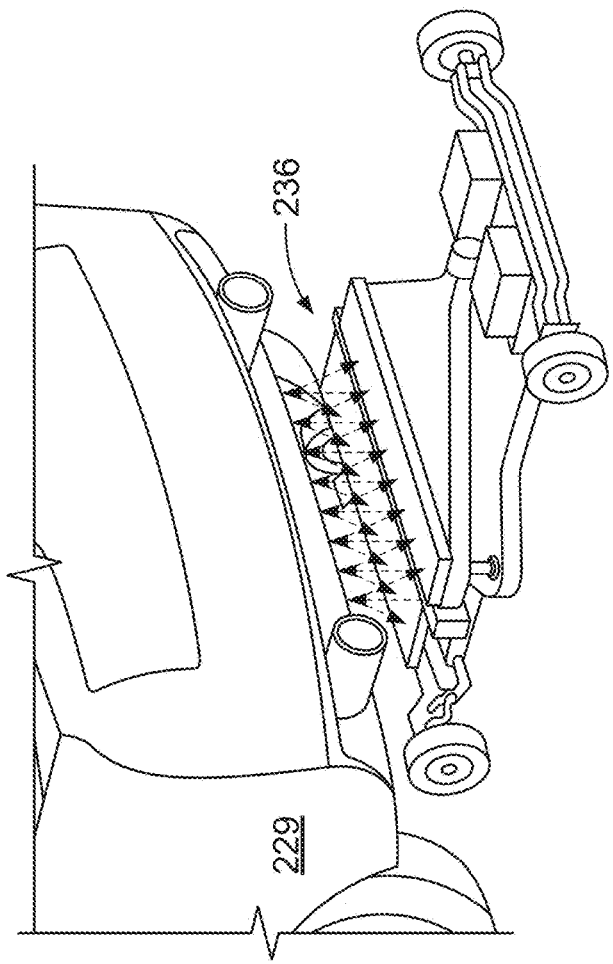
FIG. 13B shows a backscatter unit that, by virtue of WSF detectors in accordance with the present specification, may be slid under a vehicle for under-chassis inspection.
Figure 13C:
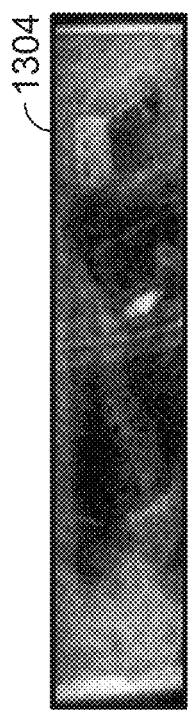
FIG. 13C illustrates an image of the underside of a vehicle obtained by using a portable backscatter scanning system, in accordance with an embodiment of the present specification.
Figure 13D:
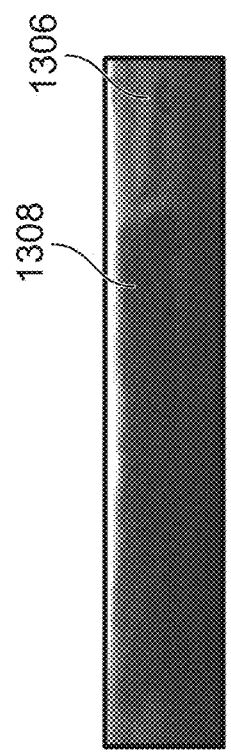
FIG. 13D illustrates an image of the underside of a vehicle obtained by using a portable backscatter scanning system wirelessly connected to a transmission detector panel, in accordance with an embodiment of the present specification.

FIGS. 13A and 13B illustrate a portable X-ray backscatter system that is not more than 6" high, and which can be connected to a transmission detector panel positioned at a location above the vehicle 229 being scanned, wirelessly as explained above. The backscatter system 231 comprises an electromagnetic scanner 221 of an electron beam across an anode. Electromagnetic scanner 221 is driven by electronics module 223. The X-rays are collimated by a linear array of apertures 251 that span, for example, 30" of the underside in one pass. The Sc-WSF detectors 227 are mounted on each side of the X-ray tube so as detect X-rays 236 backscattered from vehicle 229. Power supplies, pulse and image processors can be mounted appropriately. A chassis of inspection unit 231 on wheels 232 may be adapted to be maneuvered under vehicle 229 by motor or manual control. In an embodiment where the vehicle 229 is scanned using only the backscatter system 231, some of the threat items concealed in the underside of the vehicle are not visible in the obtained scanned image. However, when the backscatter scanning system 231 is connected wirelessly to a transmission detector panel positioned at a location above the vehicle 229 being scanned, even an explosive object such as a pipe bomb concealed in the underside of the vehicle 229 is visible in the transmission scan image. FIG. 13C illustrates an image 1304 of the underside of a vehicle obtained by using a portable backscatter scanning system, in accordance with an embodiment of the present specification. As shown in FIG. 13C the explosive object which is a pipe bomb is not visible in the scanning image 1304 obtained by using only the backscatter scanning system 231. FIG. 13D illustrates an image 1306 of the underside of a vehicle obtained by using a portable backscatter scanning system wirelessly connected to a transmission detector panel, in accordance with an embodiment of the present specification. As shown in FIG. 13D the pipe bomb 1308 is clearly visible in the scanning image 1306 obtained by operating a WSS detector panel in a transmission mode connected wirelessly to the underside of a vehicle obtained by using the portable backscatter scanning system 231, which scans the underside of the vehicle 229.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:
1. An X-ray scanner, comprising:
 a housing;
 an X-ray source positioned in the housing;
 a backscatter detector physically coupled to the housing system;
 a transmission detector adapted to be positioned remote from the housing and not physically coupled to the housing, wherein the transmission detector is adapted to generate a signal when X-rays emitted by the X-ray source impinge on a surface of the transmitter detector after passing through an object being scanned and wherein the transmission detector further comprises a wireless transmitter for transmitting the signal; and a controller physically coupled to the housing and adapted to control an operation of the X-ray source, wherein the controller comprises a receiver configured to receive the wirelessly transmitted signal from the transmission detector, wherein the transmitter and the receiver operate in a frequency range of 6 Mhz to 6 Ghz, and wherein the controller further comprises a buffer coupled to the receiver and configured to store data indicative of the signal for a predefined period of time, wherein the predefined period of time is a function of at least one of a time when the signal is generated, a time when the signal is received, or a time when a signal from the backscatter detector is generated.

2. The X-ray scanner of claim 1, wherein the transmitter is positioned on an external surface of the transmission detector.

3. The X-ray scanner of claim 1, wherein the transmission detector further comprises a pre-amplifier coupled with the at least one photomultiplier tube and is adapted to amplify the signal.

4. The X-ray scanner of claim 1, wherein the X-ray scanner is configured to be hand-held.

5. The X-ray scanner of claim 1, wherein the transmitter further comprises an amplitude modulator adapted to modulate an amplitude of the signal before transmitting the signal.

6. The X-ray scanner of claim 5, wherein the receiver comprises an amplitude demodulator for demodulating the amplitude of the transmitted signal before transmitting the signal to the buffer.

7. The X-ray scanner of claim 1, wherein the transmitter polarizes the signal before transmission for avoiding interference with one or more signals having a same frequency as the signal being transmitted, wherein the polarization is one of: a horizontal polarization or a vertical polarization.

8. The X-ray scanner of claim 1, wherein the receiver is positioned on an external surface of the transmission detector.

9. An X-ray scanner comprising:
a housing;
an X-ray source positioned in the housing;
a rotating collimator positioned proximate the X-ray source and configured to collimate X-ray beams emanating from the X-ray source;
a backscatter detector physically coupled to the housing system;
a transmission detector adapted to be positioned remote from the housing and not physically coupled to the housing, wherein the transmission detector is adapted to generate a signal when the X-ray beams emitted by the X-ray source impinge on a surface of the transmitter detector after passing through an object being scanned and wherein the transmission detector further comprises a wireless transmitter for transmitting the signal; and
a controller physically coupled to the housing and adapted to control an operation of the X-ray source, wherein the controller comprises a receiver configured to receive the wirelessly transmitted signal from the transmission detector and wherein the controller further comprises a buffer coupled to the receiver and configured to store data indicative of the signal for a predefined period of time, wherein the predefined period of time is a function of at least one of a time when the signal is generated, a position of the rotating collimator, a time when the signal is received, or a time when a signal from the backscatter detector is generated.

10. The X-ray scanner of claim 9, wherein the transmission detector comprises a plurality of wavelength shifting fibers (WSF) coupled with at least one photomultiplier tube.

11. The X-ray scanner of claim 9, further comprising an analog to digital (A/D) converter coupled to the transmission detector and adapted to convert the signal to a digital signal, wherein an operation of the A/D converter is synchronized using time data from a first clock coupled with the transmission detector.

12. The X-ray scanner of claim 11, wherein the transmitter coupled with the transmission detector is adapted to transmit the signal and the time data from the first clock.

13. The X-ray scanner of claim 12, wherein the receiver coupled with the controller is adapted to receive the signal and the time data from the first clock.

14. The X-ray scanner of claim 11, wherein the predefined period of time is a function of the time data and the position of the rotating collimator.

15. The X-ray scanner of claim 14, wherein the controller comprises a digital to analog (D/A) converter coupled with the buffer and adapted to convert the buffered signal to an analog signal after the expiry of the predefined period of time, wherein an operation of the D/A converter is synchronized using time data from a second clock coupled with the buffer, and wherein the time data of the second clock is synchronized using the time data of the first clock.

16. The X-ray scanner of claim 15, wherein the time data of the first clock and the time data of the second clock are synchronized using at least one of a GPS based clock system or a temporary hardwire connection.

17. The X-ray scanner of claim 9, wherein the transmitter is positioned on an external surface of the transmission detector.

18. The X-ray scanner of claim 9, wherein the transmission detector further comprises a pre-amplifier coupled with at least one photomultiplier tube and is adapted to amplify the signal.

19. The X-ray scanner of claim 9, wherein the X-ray scanner is configured to be hand-held.

20. The X-ray scanner of claim 9, wherein the transmitter further comprises an amplitude modulator adapted to modulate an amplitude of the signal before transmitting the signal.

21. The X-ray scanner of claim 9, wherein the predefined period of time is a function of a time taken for one rotation of the collimator.

22. The X-ray scanner of claim 21, wherein the controller comprises a digital to analog (D/A) converter coupled with the buffer and adapted to convert the buffered signal to an analog signal at a delay equal to the time taken for one rotation of the collimator.

23. The X-ray scanner of claim 9, wherein the transmitter is configured to polarize the signal before wirelessly transmitting the signal to avoid interfering with one or more signals having a same frequency as the signal being transmitted.

24. The X-ray scanner of claim 23, wherein the polarization is at least one of a horizontal polarization such that an electrical field of the signal oscillates in a horizontal plane, a vertical polarization such that the electrical field of the signal oscillates in a vertical plane, or an angled plane such that the electrical field of the signal oscillates in a plane that has a non-zero angle relative to the horizontal plane and the vertical plane.

25. An X-ray scanner comprising:
a housing;
an X-ray source positioned in the housing;

a rotating collimator positioned proximate the X-ray source and configured to collimate X-ray beams emanating from the X-ray source;

a backscatter detector physically coupled to the housing system;

a transmission detector adapted to be positioned remote from the housing and not physically coupled to the housing, wherein the transmission detector is adapted to generate a signal when the X-ray beams emitted by the X-ray source impinge on a surface of the transmitter detector after passing through an object being scanned and wherein the transmission detector further comprises a wireless transmitter for transmitting the signal; and a controller physically coupled to the housing and adapted to control an operation of the X-ray source, wherein the controller comprises a receiver configured to receive the wirelessly transmitted signal from the transmission detector and wherein the controller further comprises a buffer coupled to the receiver and configured to store data indicative of the signal for a predefined period of time, wherein the predefined period of time is a function of a position of the rotating collimator.

26. The X-ray scanner of claim 25, wherein the transmission detector comprises a plurality of wavelength shifting fibers (WSF) coupled with at least one photomultiplier tube.

27. The X-ray scanner of claim 25, further comprising an analog to digital (A/D) converter coupled to the transmission detector and adapted to convert the signal to a digital signal, wherein an operation of the A/D converter is synchronized using time data from a first clock coupled with the transmission detector.

28. The X-ray scanner of claim 27, wherein the transmitter coupled with the transmission detector is adapted to transmit the signal and the time data from the first clock and wherein the receiver coupled with the controller is adapted to receive the signal and the time data from the first clock.

29. The X-ray scanner of claim 25, wherein the X-ray scanner is configured to be hand-held.

30. The X-ray scanner of claim 25, wherein the transmitter further comprises an amplitude modulator adapted to modulate an amplitude of the signal before transmitting the signal.

31. The X-ray scanner of claim 25, wherein the controller comprises a digital to analog (D/A) converter coupled with the buffer and adapted to convert the buffered signal to an analog signal at a delay equal to the time taken for one rotation of the collimator.

32. The X-ray scanner of claim 25, wherein the transmitter is configured to polarize the signal before wirelessly transmitting the signal to avoid interfering with one or more signals having a same frequency as the signal being transmitted.

* * * * *